United States Patent
Chadha et al.

(10) Patent No.: US 10,198,516 B2
(45) Date of Patent: *Feb. 5, 2019

(54) REAL-TIME AND ADAPTIVE DATA MINING

(71) Applicant: Rule 14, Santa Monica, CA (US)

(72) Inventors: Sharon Gill Chadha, Santa Monica, CA (US); Xin Cheng, San Diego, CA (US); Parvinder Chadha, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,316

(22) Filed: Dec. 4, 2015

(65) Prior Publication Data

US 2016/0085826 A1    Mar. 24, 2016

Related U.S. Application Data

(63) Continuation-in-part of application No. 13/928,313, filed on Jun. 26, 2013, now Pat. No. 9,229,977.

(60) Provisional application No. 61/679,024, filed on Aug. 2, 2012.

(51) Int. Cl.
*G06F 7/00* (2006.01)
*G06F 17/30* (2006.01)

(52) U.S. Cl.
CPC .. *G06F 17/30867* (2013.01); *G06F 17/30536* (2013.01); *G06F 17/30864* (2013.01)

(58) Field of Classification Search
CPC ......... G06F 17/30672; G06F 17/30442; G06F 17/30796
USPC ................................................ 707/722, 765
See application file for complete search history.

(56) References Cited

U.S. PATENT DOCUMENTS

| | | | |
|---|---|---|---|
| 5,627,886 A * | 5/1997 | Bowman | H04M 3/36 379/111 |
| 6,260,041 B1 | 7/2001 | Gonzalez et al. | |
| 8,078,489 B1 | 12/2011 | Marsten | |
| 8,260,774 B1 * | 9/2012 | Aggarwal | G06F 17/30864 707/723 |
| 8,301,486 B1 | 10/2012 | Marsten | |
| 8,498,889 B1 | 7/2013 | Marsten | |
| 2002/0143932 A1 * | 10/2002 | Quintero | G06F 17/3089 709/224 |
| 2004/0015481 A1 | 1/2004 | Zinda | |
| 2004/0215607 A1 * | 10/2004 | Travis, Jr. | G06F 17/30864 |
| 2005/0192899 A1 * | 9/2005 | Reardon | G06Q 20/10 705/40 |
| 2005/0283473 A1 | 12/2005 | Rousso et al. | |
| 2008/0065569 A1 * | 3/2008 | Dutt | G06Q 30/08 705/404 |
| 2008/0201339 A1 | 8/2008 | McGrew et al. | |
| 2008/0270344 A1 | 10/2008 | Yurick et al. | |
| 2009/0125371 A1 * | 5/2009 | Neylon | G06F 17/30616 707/739 |

(Continued)

OTHER PUBLICATIONS

International Search Report and Written Opinion—PCT/US2014/044134—ISA/US—Apr. 1, 2015.

*Primary Examiner* — Michael Pham
(74) *Attorney, Agent, or Firm* — Seyfarth Shaw LLP; Puya Partow-Navid

(57) ABSTRACT

A method of analyzing data is presented. The method includes generating a query based on a topic of interest, expanding search terms of the query, executing the query on one or more data sources, monitoring a specific data source selected from the one or more data sources. The monitoring is performed to monitor for matches to the query.

20 Claims, 14 Drawing Sheets

(56) References Cited

U.S. PATENT DOCUMENTS

| | | | |
|---|---|---|---|
| 2010/0114954 A1* | 5/2010 | Sareen | G06F 17/30864 |
| | | | 707/776 |
| 2011/0047161 A1 | 2/2011 | Myaeng et al. | |
| 2012/0017218 A1* | 1/2012 | Branson | G06F 9/50 |
| | | | 718/104 |
| 2012/0150645 A1 | 6/2012 | Mandyam et al. | |
| 2012/0323627 A1* | 12/2012 | Herring, Jr. | G06Q 10/00 |
| | | | 705/7.29 |
| 2013/0282702 A1 | 10/2013 | Zhu et al. | |
| 2013/0311485 A1* | 11/2013 | Khan | G06F 17/2785 |
| | | | 707/748 |
| 2013/0325838 A1 | 12/2013 | Liao | |

* cited by examiner

REAL-TIME AND ADAPTIVE DATA MINING

CROSS-REFERENCE TO RELATED APPLICATION

This application is a continuation-in-part of U.S. patent application Ser. No. 13/928,313, entitled "REAL-TIME AND ADAPTIVE DATA MINING," filed on Jun. 26, 2013, now U.S. Pat. No. 9,229,977, which claims the benefit under 35 U.S.C. § 119(e) to U.S. Provisional Patent Application No. 61/679,024 entitled "LOSS PREVENTION SERVICES PLATFORM BASED ON MACHINE LEARNING," filed on Aug. 2, 2012, the disclosures of which are expressly incorporated by reference herein in their entireties.

BACKGROUND

Field

Aspects of the present disclosure relate generally to data mining, and more particularly to providing a real-time data mining platform and interactive feedback platform.

Background

The Internet provides and generates large amounts of data on a daily basis. The data may be monitored from data sources, such as, but not limited to, social media, web feeds, customer feedback, internal company databases, and proprietary data silos. With the proper tools, the data extracted from the data sources may be used to provide analysis for various topics. For example, the extracted data may indicate patterns for domestic unrest or a customer's habits/patterns. More specifically, as an example, the extracted data may yield a consumers financial profile, retail history, social influences, and expressed interests.

Typical search engines are not designed for analyzing multiple data points in real time. Furthermore, the query of a search engine is limited to the exact search term. Moreover, a typical search engine is limited to querying indexed web sites. That is, search engines are typically limited to searching structured data sources. By some accounts, nearly seventy percent of web pages are not indexed by search engines. The non-indexed web pages may be, for example, proprietary data silos, web sites behind firewalls, and/or comment sections on a web page. Accordingly, the information obtained via search engines is limited and is not desirable for real-time data analysis that is specified for automated data extraction.

Thus, as the demand for real-time information continues to increase, there exists a need for further improvements in data mining and web searching technologies. Preferably, these improvements should be applicable to all real-time data extraction technologies and the digital systems that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

According to an aspect of the present disclosure, a method of analyzing data is presented. The method includes generating a query based on a topic of interest. The method also includes expanding search terms of the query. The method further includes executing the query on one or more data sources. The method still further includes monitoring a specific data source selected from the one or more data sources. The monitoring is performed to monitor for matches to the query.

According to another aspect of the present disclosure, an apparatus for analyzing data is presented. The apparatus includes a memory unit and a processor(s) coupled to the memory unit. The processor(s) is configured to generate a query based on a topic of interest. The processor(s) is also configured to expand search terms of the query. The processor(s) is further configured to execute the query on one or more data sources. The processor(s) is still further configured to monitor a specific data source selected from the one or more data sources. The monitoring is performed to monitor for matches to the query.

In yet another aspect of the present disclosure, a computer program product for data analysis having a non-transitory computer-readable medium is disclosed. The computer readable medium has non-transitory program code recorded thereon which, when executed by the processor(s), causes the processor(s) to perform operations of generating a query based on a topic of interest. The program code also causes the processor(s) to expand search terms of the query. The program code further causes the processor(s) to execute the query on one or more data sources. The program code still further causes the processor(s) to monitor a specific data source selected from the one or more data sources. The monitoring is performed to monitor for matches to the query.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
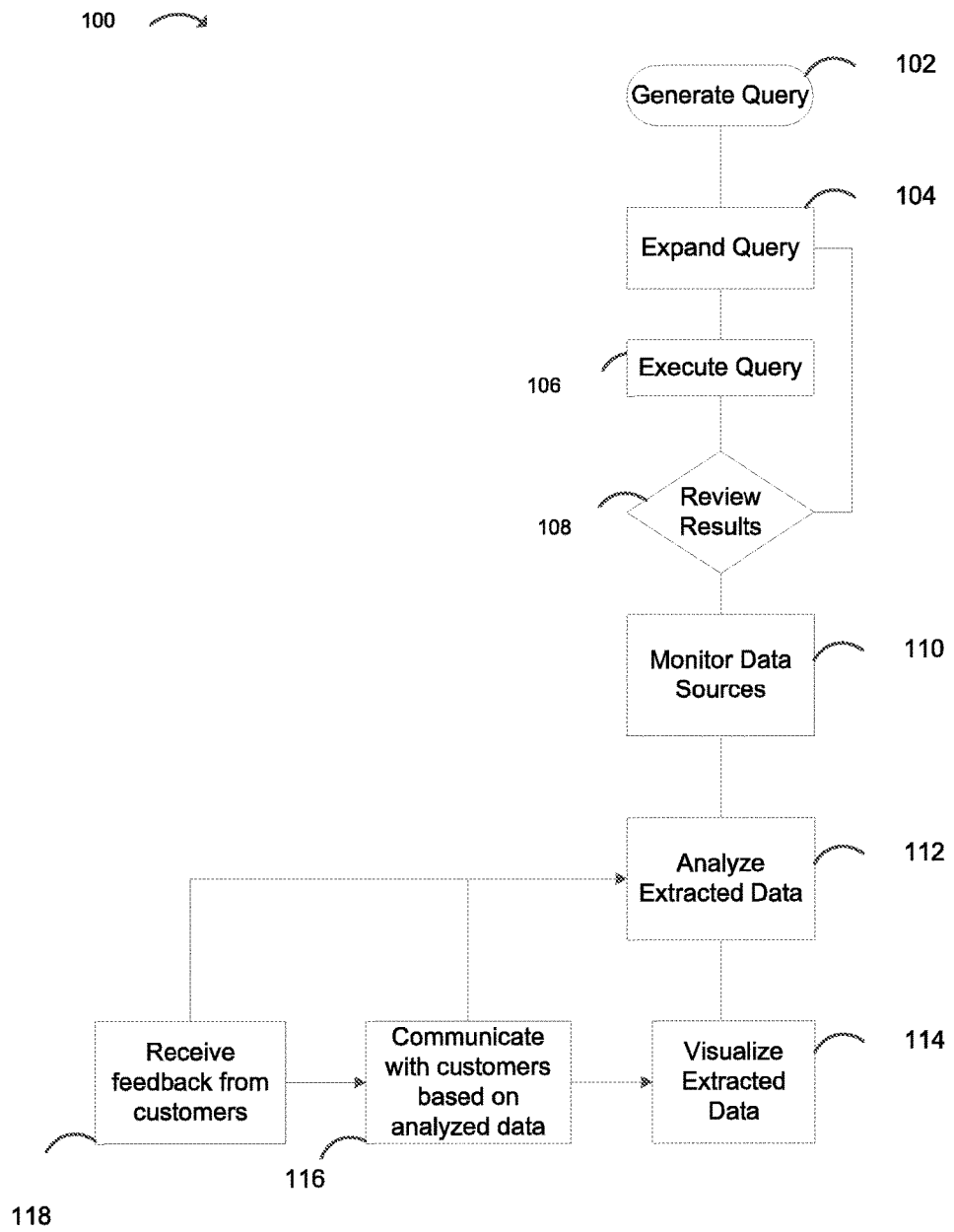
FIG. 1 is a diagram illustrating a call flow for a data mining system according to an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the data mining systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a call flow for a data mining system 100 according to an aspect of the present disclosure. At block 102 a query is generated. The query may be a natural language query generated by a user. Alternatively, the query generation may be automated from a query generator. The query generator may be based on artificial intelligence or a similar system.

At block 104 the query is expanded. In one configuration, the search terms of the query are expanded based on search lexicons. For example, the lexicons may be applied to expand the search using misspellings and derivations of the topic of interest/sub-topics. The lexicon may be generated based on user input and/or may be generated based on automatic word association, such as synonym/antonym trees and lexicons of positive and/or negative modifiers. The expansion of the query at block 104 may be performed by a user and/or may be automated.

At block 106, the query is executed. The query may be executed on open-source data and proprietary data. Specifically, in one configuration, the query may be limited to specific data sources (e.g., proprietary data sources and open-source data sources). In another configuration, the query searches all available data sources. In yet another configuration, the initial pass of the query is limited to open-source data sources.

Open-source data refers to publicly available data, such as data available via Wikipedia or the CIA fact book, for example. Sources that are indexed by search engines are also considered open-source data. Open-source data may also refer to data that is not proprietary but still not indexed by a search engine. For example, some sources, such as a blog, may include a comments section. The comments may be updated in real time and are typically not indexed by a search engine. Thus, because the comments are not indexed by a search engine, the contents of the comments are not available when conducting a search. Still, the information in the comments is publically available to anyone that visits a particular source. Therefore, the comments section, or any other non-indexed source may be considered open-source data.

Proprietary data is data that may not be searchable via a search engine because the proprietary data is not publically available. This may include classified databases, data behind a firewall, or data that is available via a paid subscription, such as Lexis.

At block 108 the results of the query are reviewed. If the results are satisfactory, specific data sources may be selected to be monitored. If the results are not satisfactory, the query may be expanded and/or refined at block 104. The refinement of the query may be refined based on data sources selected at block 108. At block 110 the selected data sources are monitored. The monitoring may be performed by data extractors that monitor changes to a data source in real-time. When information at the data sources is updated or located to match the query terms, a data extractor extracts the data to be analyzed at block 112. In one configuration, a quality control analysis may also be performed on the extracted data (not shown). After analyzing the data, the extracted data may be visualized at block 114.

Additionally, after the data has been analyzed, at block 116, a communication channel may be established with specific individuals and/or other users based on the analyzed data. For example, if the data analysis reveals that a customer may be planning a trip to another country, the data mining system 100 may engage the customer to discuss cell phone data roaming plans and/or other services that may be desired by a customer that is traveling to another country. Furthermore, at block 118, customers and/or users may provide feedback. That is, the customers may provide feedback to the system via a pre-defined communication channel, such as a message board, phone, SMS, or email. The feedback is analyzed at block 112 to determine customer sentiment. Furthermore, in addition to or separate from the open forum, the feedback may also be generated based on the communication channel established at block 116.

In another configuration, the communication channel of block 116 may be established after the extracted data has been visualized at block 114. It should be noted, the communication channel of block 116 and the visualization of block 114 may be established in parallel or independently. Furthermore, in one configuration, the feedback received at block 118 may be visualized in block 114.

Figure 2:
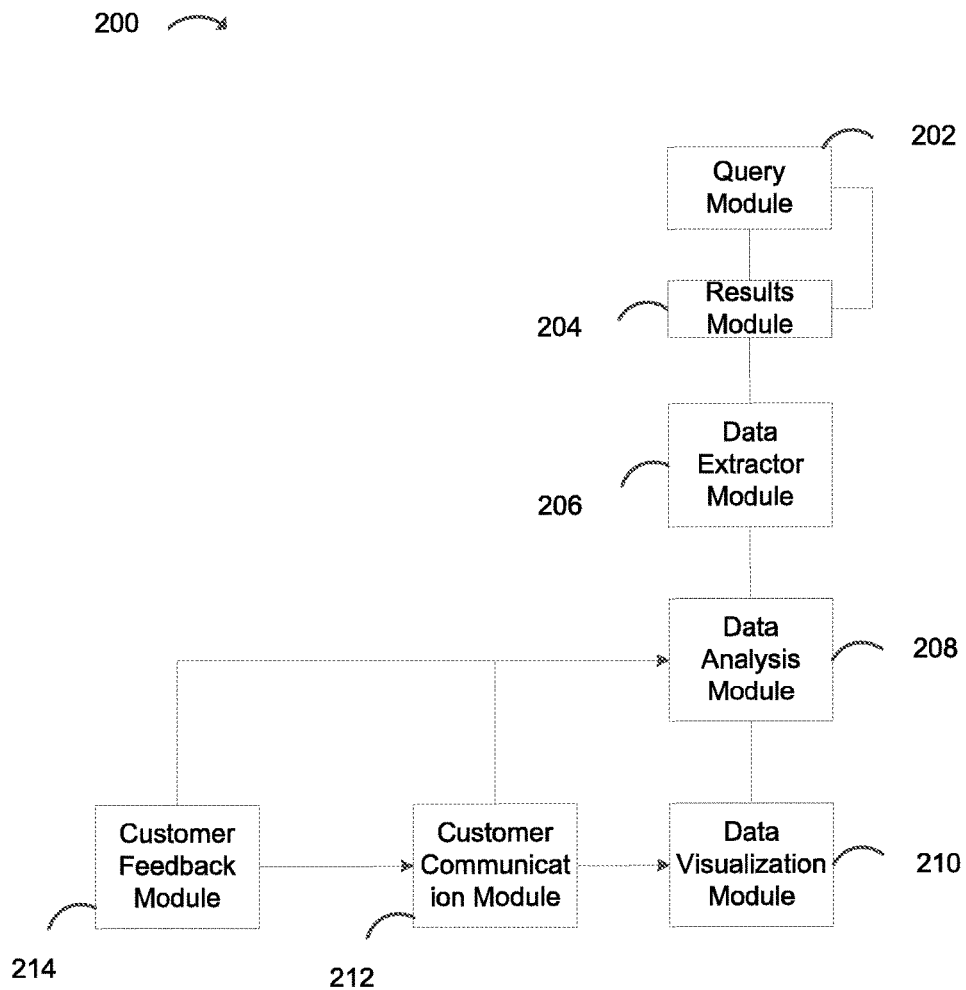
FIG. 2 is a block diagram for a data mining system according to an aspect of the present disclosure.

FIG. 2 illustrates a data mining system 200 according to an aspect of the present disclosure. Those of skill would further appreciate that the various illustrative modules of FIG. 2 may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The data mining system 200 may include a query module 202 for generating a query. As discussed above, in one configuration, a query is generated for searching specific data sources. In one configuration, the query is a natural language query. For example, the natural language query may be "I want to know the sentiment of wireless phone customers." The query represents a topic of interest (TOI), for example, the topic of interest may be a person, such as Michael Jackson, an event, such as the Arab Spring, a service, such as wireless phone, and/or any other informational element that may be queried.

Additionally, the data sources may include websites, private databases, public databases, and/or any data source that may be electronically accessed. Furthermore, the query may further specify the parties that hold the opinion, such as the author of the content. Thus, in one configuration, the query may specify the sources of the data, such as URLs, websites of specific countries, and/or internal/external data silos. Furthermore, the query may further specify the author of the specified data sources, such as, main stream media, bloggers, user comments, and/or social media.

Furthermore, in one configuration, the query may be specified for a specific time frame. The time frame may be a specific time frame of the past, a time frame of the future, or a specific interval. For example, the query may only apply to events that occurred in the summer of 2012. As another example, the query may be generated to run in three months from the date of origin for the query.

In one configuration, after generating the query, open-source data is mined using the topic of interest and sub-topics. Sub-topics refer to topics related to the topic of interest. For example, for the query "I want to know the sentiment of wireless phone customers," the topic of interest may be a specific wireless provider and/or "wireless phone customers." Furthermore, in the present example, the sub-topics may be "iPhone customers" and "wireless customers." The open-source data refers to data that is generally available to the public. For example, data that is not deemed classified by a sovereign entity may be one source of open-source data. Open-source data may also include, but is not limited to, data available via a website, a data base, and/or a really simple syndication (RSS) feed.

After mining the open-source data using the topic of interest and sub-topics, the query parameters (e.g., search parameters) may be expanded and/or further processed. That is, during the initial query generation, the user defines the scope of the query. Specifically, the user determines, to the best of their ability, the topics of interest and their sub-topics. After the query is executed, the user may find unintended search results. Some of the unintended search results may be false positives, while others may be relevant to the context of the query. Consequently, the user may add additional items to the topics of interest and/or sub-topics based on the unintended search results.

According to one aspect of the present disclosure, the query expansion and/or further processing may be performed in the query module 202. Alternatively, the query expansion and/or further processing may be performed in a module that is separate from the query module 202 (not shown).

In one configuration, a lexicon is applied to expand on the search parameters. The lexicon may be applied prior to the initial search and/or during the query expansion phase. The lexicon may also include misspellings and derivations of the topic of interest/sub-topics. The lexicon may be generated based on user input and/or may be generated based on automatic word association, such as synonym/antonym trees and lexicons of positive and/or negative modifiers.

As an example, for the query "Arab spring," the lexicon may be applied to expand the search to include relevant search terms such as, for example, "revolution," and/or "unrest." In this example, the lexicon may also apply misspellings, such as "spring," to the search terms.

The expanded query is run on the data sources and the results are analyzed via a results module 204. The expanded query may be performed across meta-data for the web. Furthermore, in addition to, or separate from the meta-data search, in one configuration, the query is also performed on the selected data sources. If the results of the query are deemed satisfactory, data extractors are generated to monitor one or more of the specified data sources. That is, the results of the query are reviewed by a user, after reviewing the results, one or more of the data sources are selected based on the accuracy of the search results. The user may also select or exclude data sources that are false positives. False positives refer to data sources that are not relevant to the topic of interest but are still returned because the data source matches the query.

For example, the topic of interest for a query may be "Arab spring" and the results may include topics that are not related to the topic of interest (e.g., false positives). In this example, a search for a search of "Arab spring" may have generated false positive search results such as "Arab spring water" or sources related to the spring season in the Middle East. Accordingly, sources related to these false positives may be excluded from further iterations of the search. Moreover, sources specifically related to the Arab spring uprisings may be selected by the user based on their accuracy.

Once the specific data sources have been selected, data extractors are deployed to monitor the specific data sources. In one configuration, when the results of the query do not yield results that are satisfactory to the user, the query is further refined until the desired results are obtained.

The data mining system 200 may include a data extractor module 206 for deploying data extractors. The data extractors may be referred to as extractors. Extractors refer to applications that monitor and extract data from user-specified locations or sources of interest (e.g., data source). That is, upon deployment, the extractors extract the data from a given source for analysis. Moreover, until terminated, the extractors are maintained at the data source to monitor for any changes to the data. The data changes are analyzed for a match to the key words of the query and the data is transmitted to a data analysis module when there is a match.

In some cases, the extractors may be bots or crawlers. The number of extractors deployed for a data source may be dynamic. In one configuration, the number of data extractors deployed for a data source increases when activity on the data source increases. For example, if extractors are deployed on a social media source to follow a current event, such as the elections, the number of extractors may increase during times when traffic for the election increases. In this example, the social media traffic may increase during flash points of a campaign, such as primaries, debates, and/or election night.

In one configuration, after a data source has been identified, the content of the data source is extracted based on a schedule. For example, a user may identify a blog as a data source. Moreover, the identified blog may have multiple authors, still, the user may specify to only extract posts by a first author, rather than all of the authors. The user may also set a schedule for the extractor to determine if there is new content from the first author. The schedule may be once a week, hour, month, minute, or other time. The extractor may extract the content to determine if there is new content. After determining that there is new content, the content will transmitted to the data mining system. In this configuration, prior to deploying the extractor, the first author is identified as a topic of interest for the query. The extractor determines the identified topics of interest in external data sources such as social media, websites, proprietary data silos, and transmits the data to the data mining system for analysis.

Data is extracted when the extractor detects a relevant post. A relevant post refers to data on the data source that match the query and/or key words of the query. The extracted data may be catalogued and stored on a database in a data analysis module 208. The data may also be connected to terrestrial feature markers. The data that is stored in the database may be transmitted to a data analytics module for sentiment analysis, indexing, and/or pattern detection. Archived data is kept for each data source that is monitored.

In one configuration, sentiment analysis is performed on the extracted data. The sentiment analysis may language agnostic so that analytics may be performed in any native language, such as, for example, Arabic, Chinese, or Persian. The data analysis may also perform pattern detection, document classification, and sentiment analysis on both structured and unstructured datasets. Additionally, an analysis lexicon may be applied to the sentiment analysis.

Specifically, the data analysis module 208 may further analyze the data via linguistic patterns to determine the sentiment. That is, via the analysis lexicon, the data is processed using both a clausal and individual word level in English and/or the native language of the data. In one configuration, the data may be processed via successive passes. Numerical values may be assigned to denote sentiment. The sentiment may refer to whether the data is for or against a specific topic.

In one configuration the numerical values for the sentiment provide a specific range of numerical value to denote the strength of the sentiment. Positive sentiment may be given a value from 1 to X, 1 being the lowest value for a positive sentiment while X denoting the highest sentiment value. Additionally, negative sentiment may be given a value from −1 to −Y, −1 being the lowest value for a negative sentiment while −Y denoting the highest sentiment value.

The data mining system 200 may include a data visualization module 210 for visualizing data. The visualized data may be based on the data that is analyzed in the data analysis module 208. That is, in one configuration, the data is visualized to display sentiment patterns across datasets. The visualization may be temporal and/or spatial. Furthermore, the visualized data may be exported so that a user may directly manipulate the results.

Additionally, data mining system 200 may include a customer communication module 212 for establishing a communication channel with customers and/or other users based on the analyzed data. As discussed above, in one example, if the data analysis reveals that a customer may be planning a trip to another country, the data mining system 200 may engage the customer to discuss cell phone data roaming plans and/or other services that may be desired by a customer that is traveling to another country.

Furthermore, the data mining system 200 may include a customer feedback module 214 for customers and/or users to provide feedback. In one configuration, the feedback is based on an open forum, such as a message board, for the customers to provide feedback to the system. The feedback is analyzed at the data analysis module 208 to determine customer sentiment. Furthermore, in addition to or separate from the open forum, the feedback may also be generated based on the communication channel established via the customer communication module 212.

In another configuration, the communication channel of the customer communication module 212 may be established after the extracted data has been visualized via the data visualization module 210. Furthermore, in one configuration, the feedback received via the customer feedback module 214 may be visualized at the data visualization module 210.

Figure 3:
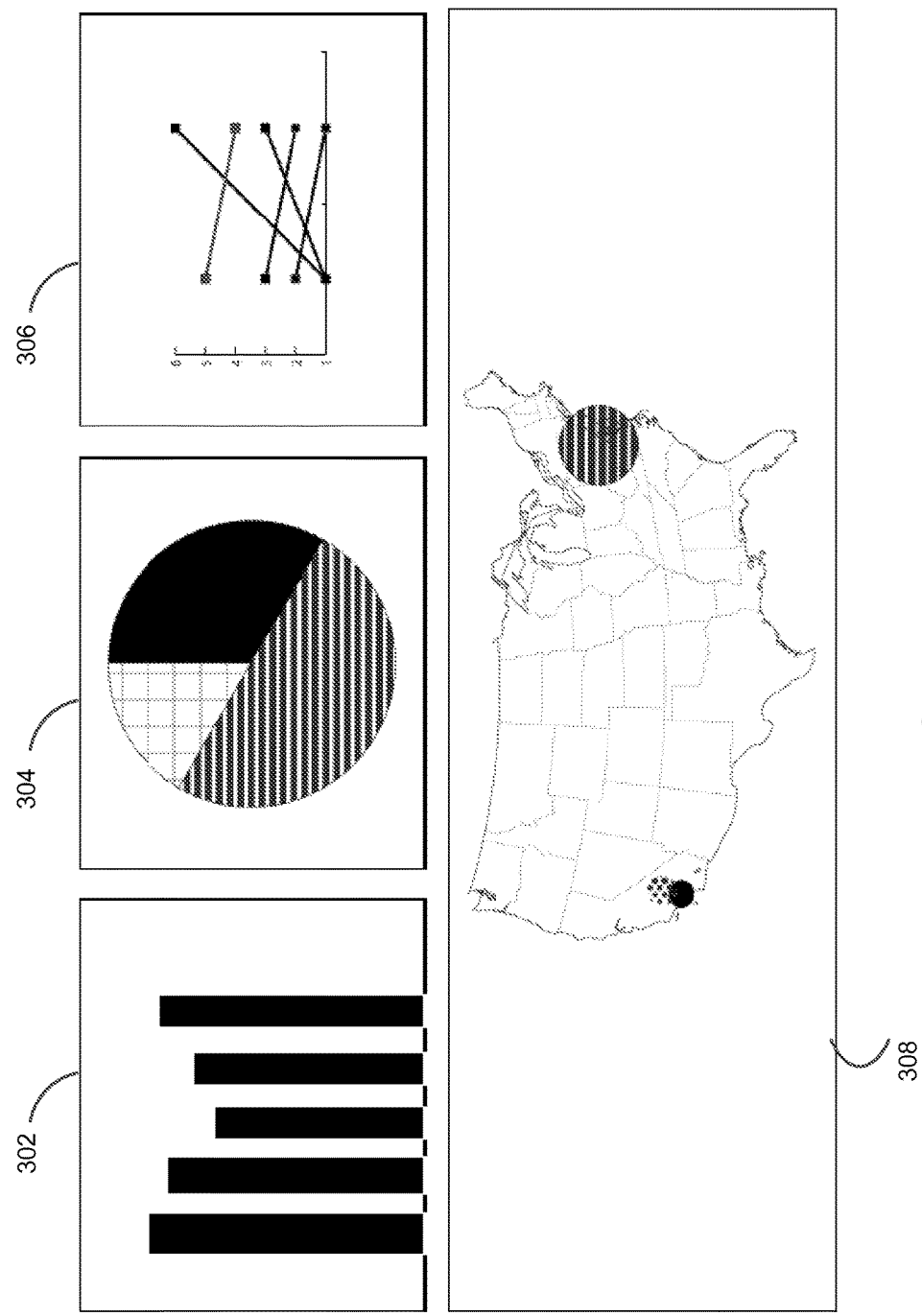
FIG. 3 illustrates various data visualization schemes according to aspects of the present disclosure.

FIG. 3 illustrates examples of data visualization according to aspects of the present disclosure. In one configuration, the data visualization is a sentiment heat map 308. That is, as shown in the sentiment heat map 308, the data may be visualized to show flash points for the extracted data. For example, if the topic of interest is "earthquakes," the heat map may show the areas in the world that have the most activity on the topic of interest. The heat map is not limited to a world map and may be visualized for any region.

In another configuration, the data visualization is a bar graph 302 for the sentiment over time. As previously discussed, the analyzed sentiment may be assigned a numerical value. Accordingly, the numerical value for the sentiment may be plotted over time and visualized as shown in the bar graph 302. For example, the topic of interest may be "alternative energy," and the visualization of the bar graph 302 may show a specific group's sentiment towards alternative forms of energy over time. In another configuration, the data visualization is pie chart 304 and/or a plot graph 306.

The data visualization is not limited to the schemes shown in FIG. 3, the data may be visualized via any desired scheme, such as, but not limited to Calendars, Box Plots, Bubble Charts and variations thereof, Bullet Charts, Chord Diagrams, Cartograms, Dendograms, Network Diagrams, Streamgraphs, Bar Graphs and variations thereof, Tree diagrams, maps, and variations thereof, Line graphs, Maps, Hierarchical Edge Bundling, Scatterplots and Scatterplot Matricies, Sankey diagram, Cluster maps and diagrams, Co-occurrence Matrices, Sunburst charts, Beziers, Word clouds, Heat maps, Timelines, Donuts and Pie charts, and/or Area charts. Moreover, the aforementioned visualizations may be based on dynamic factors, such as, but not limited to force directed movements, time elapse, pattern acceleration, and/or volume. More specifically, the data visualization may be specified to show relationships, variations, anomalies, trends, patterns, pinpoints, ranges, and/or actuals in the target data. It should be noted that the visualization options are configurable by the user and may vary based on the deployment domain and goal of the data mining system.

Figure 4:
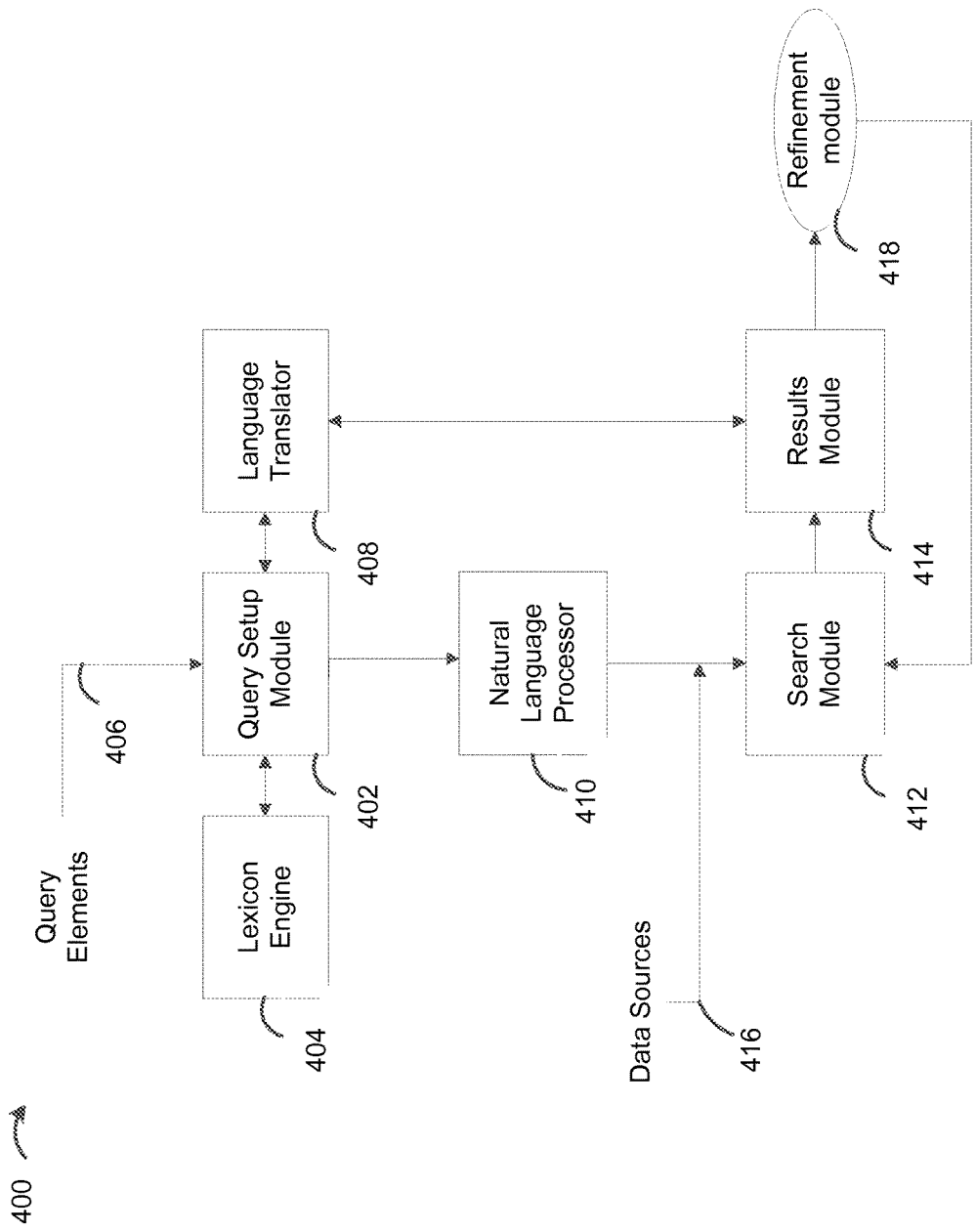
FIGS. 4-8 are block diagrams for a data mining system according to aspects of the present disclosure.

FIG. 4 is a conceptual data flow diagram illustrating the data flow between different modules/means/components in an exemplary query module 400 according to an aspect of the present disclosure. In one configuration, the data flow between different modules/means/components of the query module 202 are similar to the data flow between different modules/means/components of the query module 400.

As shown in FIG. 4, query module 400 includes a query setup module 402 for creating a query. The query setup module 402 may receive query elements via an input 406. The query elements may specify the topic of interest and subtopics of interest. In one configuration, the query elements are input by a user and/or automatically generated via a query module (not shown). As discussed above, the query elements may be a natural language query.

The query module 400 also includes a lexicon module 404 for applying lexicon elements to the query elements received at the query setup module 402. In one configuration, the lexicon elements are applied to the query elements at the query setup module 402. Alternatively, the query setup module 402 may transmit the query elements to the lexicon module 404 so that the lexicon elements may be applied to the query elements.

As discussed above, the lexicon elements may expand the query elements. In one configuration, for a query, the lexicon is applied to expand the search to include relevant search terms. The lexicon may also apply misspellings and derivations of the topic of interest/sub-topics. The lexicon may be generated based on user input and/or may be generated based on automatic word association, such as synonym/antonym trees and lexicons of positive and/or negative modifiers.

The query module 400 also includes a language translator 408 for translating the query elements received at the query setup module 402. The language translator 408 may translate the query elements and/or the results from English to another language, and vice versa. After applying the lexicon via the lexicon module 404 and translating the query elements (if necessary), the query setup module 402 transmits the query to the natural language processor 410. In one configuration, the natural language processor 410 converts the query elements to system-understood operations, such as Boolean operations.

The query module 400 also includes a search module 412 that distributes the query elements to search data sources. In one configuration, the data sources are defined by a user and are received at the search module 412 via a signal 416. Alternatively, the data sources may also be specified in the query elements received at the search module 412. Results of the search are transmitted to the results module 414. The results module 414 may sort the results and display the results to the user. In one configuration, the user may select the desired results to be stored in memory. The user may select the desired results based on the accuracy of the results and/or the information provided in the results. In one configuration, the results module 414 may be separate from the query module 400. According to an aspect of the present disclosure, the selected results are transmitted to a refinement module 418.

Figure 5:
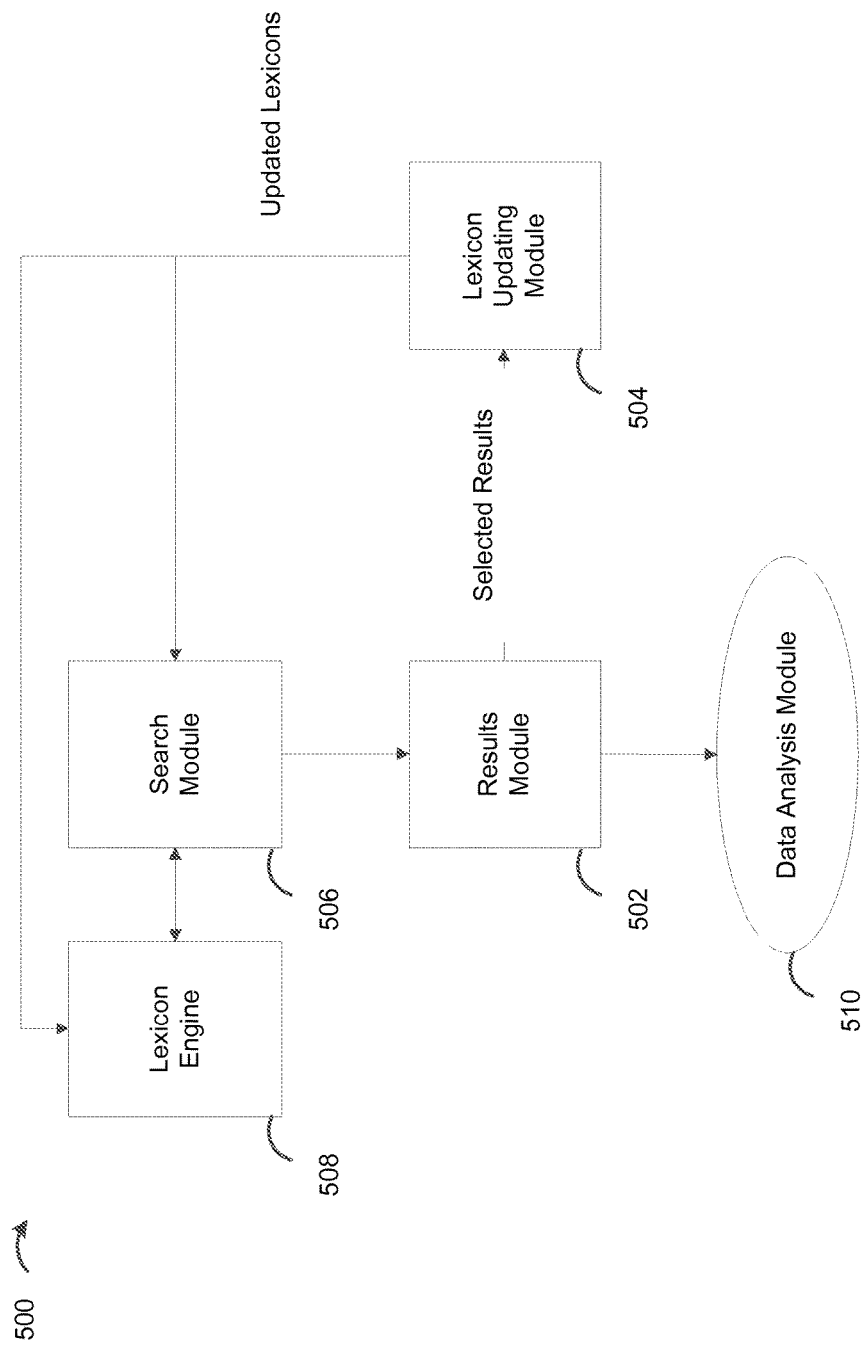

FIG. 5 is a conceptual data flow diagram illustrating the data flow between different modules/means/components in an exemplary refinement module 500 according to an aspect of the present disclosure. In one configuration, the refinement module 500 may be included in the query module 400. Still, in the present configuration, the refinement module 500 is distinct from the query module 400. Nonetheless, in the present configuration, the refinement module 500 uses some of the elements of the query module 400.

As shown in FIG. 5, the selected results from the results module 502 may be transmitted to the lexicon updating module 504. As previously discussed, at the results module 502, the user selects relevant results for processing (e.g., calibration). That is, the user may judge the results for accuracy based on the intent of the query. Based on the results selected from the query, the data mining system may refine the lexicons and the query elements.

More specifically, a search for a topic of interest may yield a plethora of results. Some results may be relevant to the search while others may be false positives. Accordingly, by understanding the data sources that are relevant to the user, the system may further refine to search terms so that a more focused search may be performed in future iterations.

Thus, the lexicon updating module 504 adjusts the lexicons based on the results selected by the user. The lexicon updating module 504 may transmit the results to the search module 506 to perform another search with the updated lexicons. Additionally, the lexicon module 508 may also be updated with the updated lexicons of the lexicon updating module 504. The lexicon module 508 may receive the updated lexicons from the search module 506 and/or the lexicon updating module 504. The refinement module 500 may run in a loop until the search results reach a desired results threshold. In one configuration, once the desired results have been received via the search module 506, the results module 502 transmits the results to a data analysis module 510.

Figure 6:
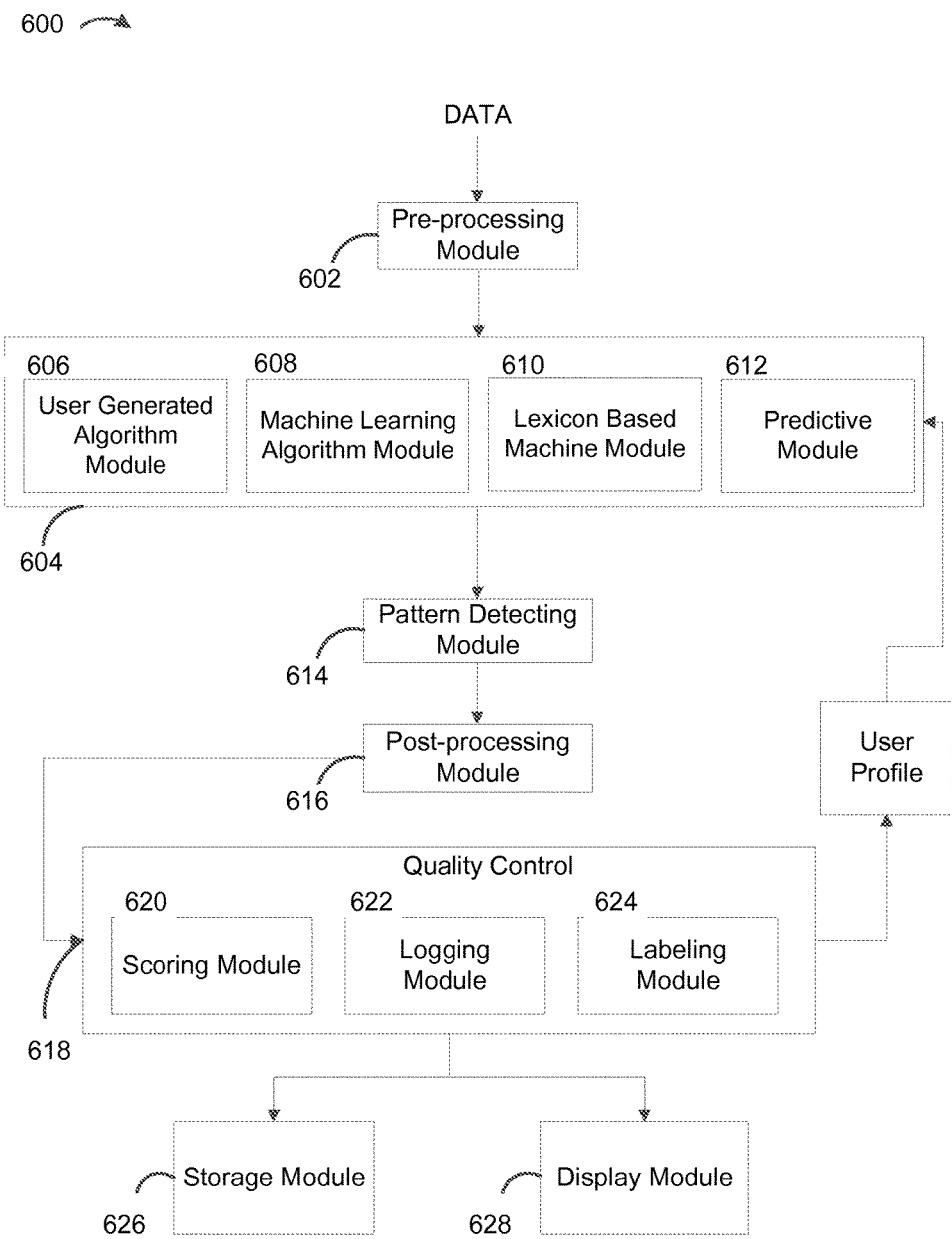

FIG. 6 is a conceptual data flow diagram illustrating the data flow between different modules/means/components in an exemplary data analysis module 600 according to an aspect of the present disclosure.

In one configuration, the data analysis module 600 includes a pre-processing module 602 that pre-processes the received data. The data may include results found by the extractors. That is, the data from the extractors may include data generated during a first pass of a search in addition to data from subsequent passes. More specifically, the data from subsequent searches may be refined and/or expanded based on the modification of the query. Moreover, the results obtained from the extractors may be time stamped, or given a unique identifier, so that the data of each pass is distinguishable from data of other passes.

In some cases, the data may be in various formats. For example, data extracted from a website may be different from data extracted from a database. Therefore, the preprocessing 602 may normalize the data to a desired format. After normalizing the data, the pre-processing module transmits the processed data to the data analysis module 604.

The data analysis module 604 may use various algorithms to analyze the normalized data. In one configuration, the data analysis module 604 includes a user generated algorithm module 606, a machine learning algorithm module 608, a lexicon based matching module 610, and a predictive module 612. In one configuration, the user generated algorithm module 606 executes an algorithm specified by the user. The machine learning algorithm module 608 may detect patterns in the data and the patterns may be applied to future data. The lexicon based matching module 610 finds key words and/or indexes in the body of the data. The predictive module 612 determines patterns in previous data and applies a probability for an occurrence of an event based on the present data. In one configuration, the data analysis module 604 includes all of the aforementioned modules or any combination thereof. Additionally, in another configuration, the user may configure the algorithm modules 606-612 that are used by the data analysis module 604.

After the data is analyzed, the data is transmitted to a pattern detecting module 614 to detect patterns in the data. In one configuration, the pattern detecting module 614 detects a spike in specific words or phrases. For example, the pattern detecting module 614 may detect a spike in the phrase "I love my iPhone 5."

The pattern detecting module 614 may also determine any causality for the spike. That is, the pattern detecting module 614 may determine what caused the spike to occur. For example, the pattern detecting module 614 may determine that the spike for the phrase "I love my iPhone 5" is based on a recent software update to the iPhone. The pattern detecting module 614 transmits the analyzed data and/or the detected patterns to the post-processing module 616. The post-processing module 616 may process the data to a format that is desired for an external system.

The data and/or detected patterns may be transmitted to a quality control module 618. In one configuration, the data may be transmitted directly from the data analysis module 604 to the quality control module 618. Likewise, the analyzed data from the data analysis module 604 may bypass either the pattern detecting module 614 or the post-processing module 616. The quality control module 618 may include a scoring module 620 for assessing the accuracy of the results over time and as compared to a human analyst. Additionally, the quality control module 618 may include a logging module 622 for logging changes to the analysis of the data over time and/or per iteration. The logging may be similar to a software version control function. Furthermore, the quality control module 618 may include a labeling module 624 for labeling the data and the datasets for later reference. The labeling may include time stamping, pattern stamping, topic labeling, or any other desired type of label (e.g., identification).

The results from the quality control are transmitted to the user profile and used for future analysis by the data analysis module 604. The results of the quality control and/or the analyzed data may be stored in a storage module 626. The storage module may also store the patterns detected via the pattern detecting module 614. The results of the quality control and/or the analyzed data may also be displayed via a display module 628. The display module 628 may also display the patterns detected via the pattern detecting module 614. Furthermore, the display module may display a notification when the quality is below a quality threshold and/or when specific analyzed data is detected. Additionally, the analyzed data from the data analysis module 604 may be used to generate notifications and/or open communication channels with users based on various criteria.

Figure 7:
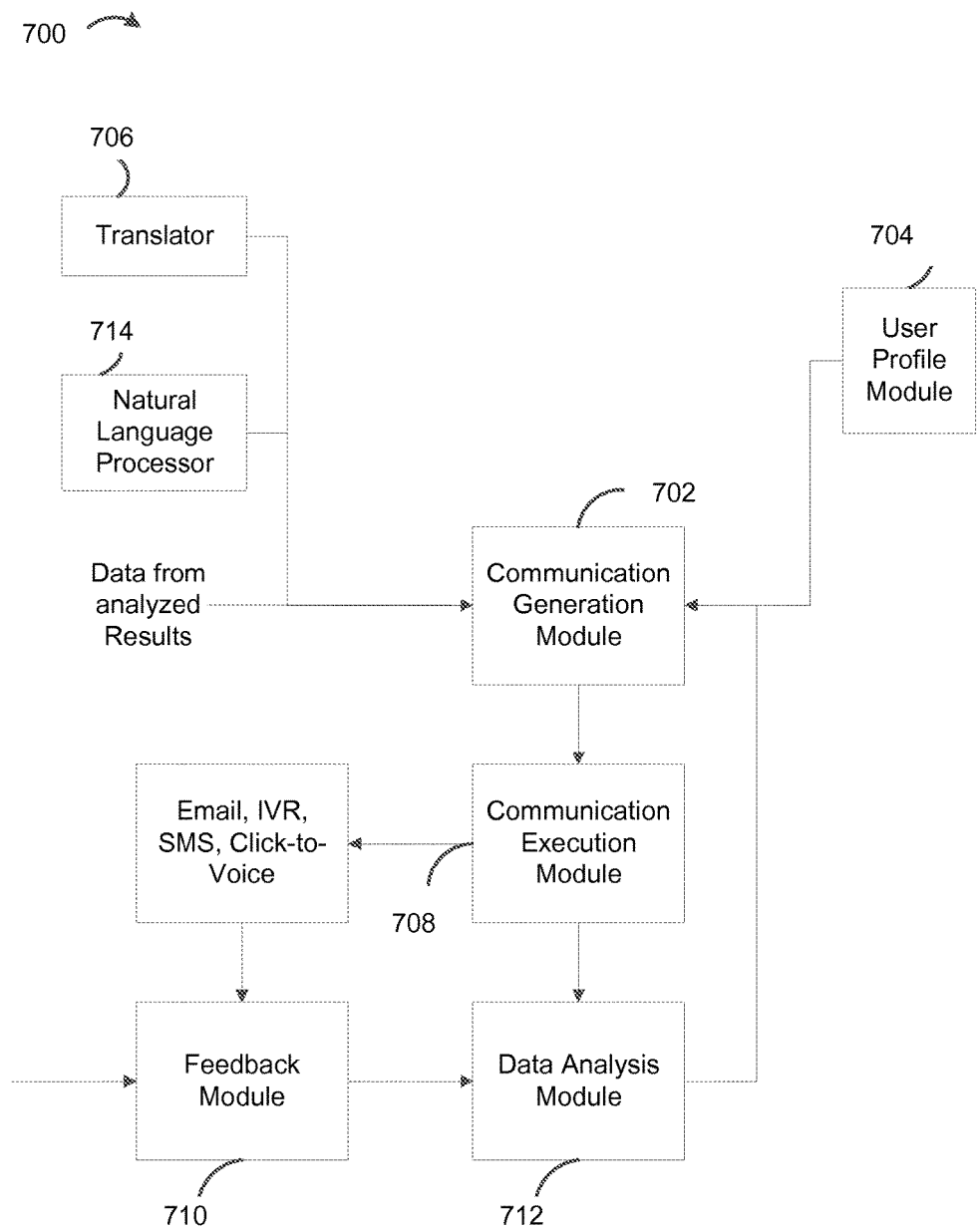

FIG. 7 is a conceptual data flow diagram illustrating the data flow between different modules/means/components in an exemplary customer communication module 700. The customer communication module may include modules to both communicate with a customer and receive feedback from a customer. In one configuration, the communication module may be a separate from the feedback module.

As shown in FIG. 7, the customer communication module 700 may include a communication generation module 702. The communication generation module 702 may receive data from the analyzed results. Furthermore, the communication generation module 702 may receive information regarding a specific user from a user profile module 704. The user information may include information such as, the user's name, address, occupation, spoken languages, physical attributes, preferred communication method, and/or any other desired details. Additionally, the communication generation module 702 may be coupled to a translating module 706 to translate the received data based on the user profile. Furthermore, the communication generation module 702 may be coupled to a natural language processor 714 to process any natural language data. That is, the natural language processor 714 may analyze the received natural language and determine semantic information from the received natural language.

Based on the data from the analyzed results, the user profile information, and the processing by the translator 706 and/or the natural language processor 714, the communication generation module 702 determines a strategy for communicating with a user. In one configuration, the strategy may be based on historical data. Historical data may include, but is not limited to, company records, sales records, and/or logged customer feedback. Once the strategy has been developed, the communication generation module 702 transmits the strategy to a communication execution module 708 for communicating with the user via one or more determined communication channels. The communication channels may include email, short message service (SMS), click-to-voice, interactive voice response (IVR), or any other desired form of communication. In one configuration, the user specifies their desired form of communication.

The customer communication module 700 may include a feedback module 710 for receiving a communication from a customer. The communication may be in response to the communication initiated via the communication execution module 708. Alternatively, the communication may be received via a portal, such as a webpage, twitter, message board, or any other communication channel. After receiving the communication from the user, the feedback module 710 transmits the data of the communication to the data analysis module 712 to analyze the data. The data is analyzed similar to the results of a query (e.g., data analysis module 510). That is, the data analysis module 712 may be the same module as the data analysis module 510 of FIG. 5. In another configuration, the data analysis module 712 may be a different module as the data analysis module 510 of FIG. 5; still, both modules would have similar functionality.

In one configuration, the data analysis module 712 may analyze the data for pattern detection and/or natural language processing. The results of the analyzed data may be reported to the user of the data mining system. Furthermore, the results may be transmitted to the communication generation module 702 for further refinement of the communication generation.

Figure 8:
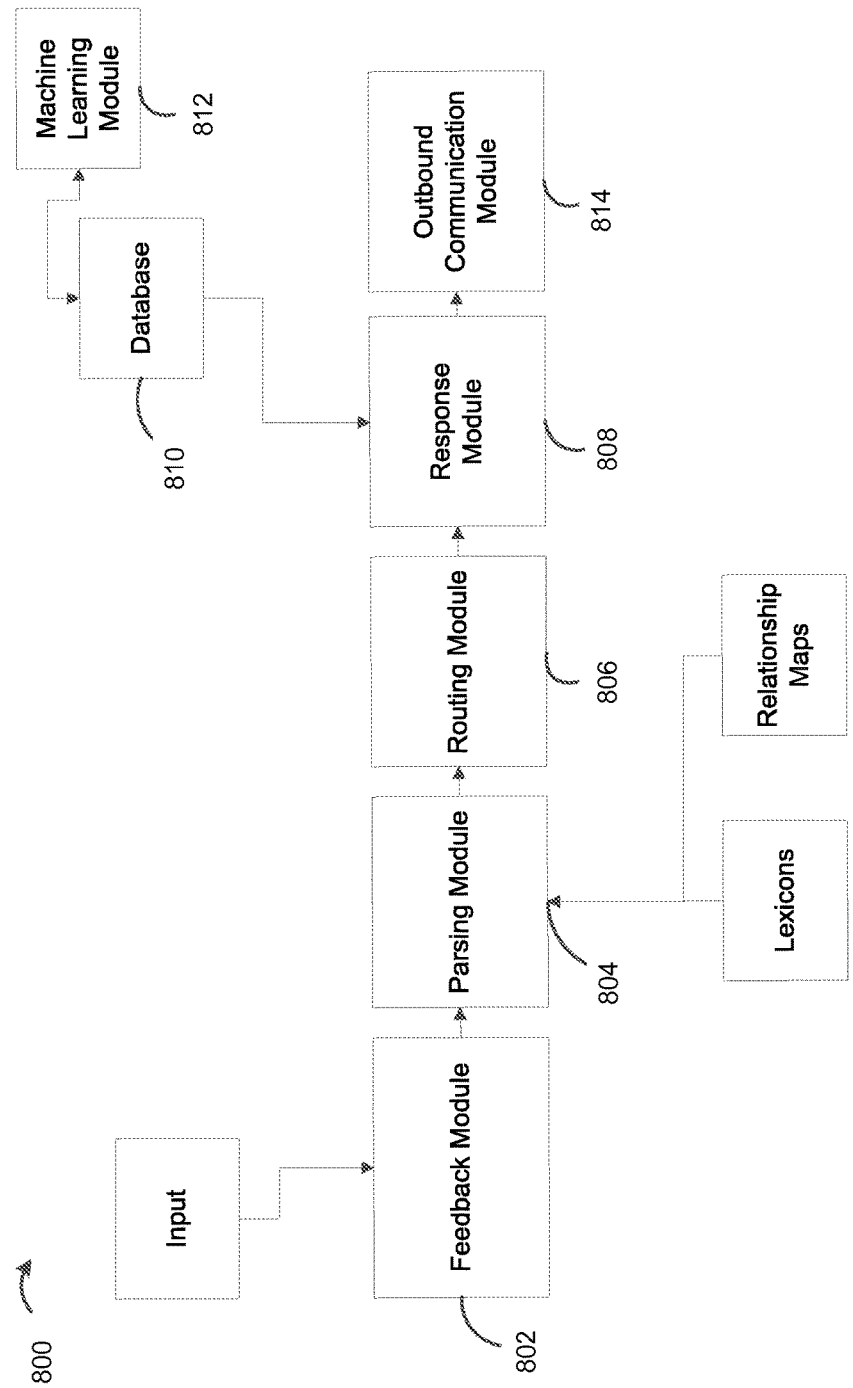

FIG. 8 is a conceptual data flow diagram illustrating the data flow between different modules/means/components in an exemplary customer communication module 800. The customer communication module 800 may include the feedback module 710 of FIG. 7. In one configuration, the customer communication module 800 of FIG. 8 is integrated with the customer communication module 700 of FIG. 7.

As shown in FIG. 8, the customer communication module 800 may include a feedback module 802 for receiving an input from a user via a communication channel. The communication channel may include, but is not limited to, SMS, email, web based communication, or a user-defined method. The feedback module 802 receives the communication, which may be received as a string of characters and processes the input to a desired format. The input is then transmitted to a parsing module 804 to be parsed based on lexicon sets and relationship maps, such as ontology sets, to classify the topic of the input.

After the string is parsed to determine the topic of the input, the parsed string is transmitted to a routing module 806 to be routed based on the identified topic. That is, the routing module 806 may look up the topic in a topic index so that the proper response is determined. After determining the proper index, the routing module 806 may transmit the topic index to the response module 808. The response module 808 determines the response from responses stored in a database 810. For example, if the string includes the words "appointment" and "schedule," the routing module 806 may determine that an index is "scheduling an appointment" and transmits the index to the response module 808. In this example, the response module 808 may then communicate with the user to schedule an appointment.

The responses in the database 810 may be updated in real time based on a machine learning module 812. For example, an index of "scheduling an appointment" may be determined based on a string including the words "appointment" and "schedule." Over time, the system may determine that communicating a response to schedule an appointment is not the appropriate response. That is, based on customer feedback, or other types of feedback, the system may determine that the proper response is to provide the user with the schedule of their appointments, or another type of response.

After determining the proper response, the response module 808 transmits the response to an outbound communication module 814 to communicate the response to the user via a desired form of communication, such as, but not limited to, email, SMS, or phone.

Figure 9:
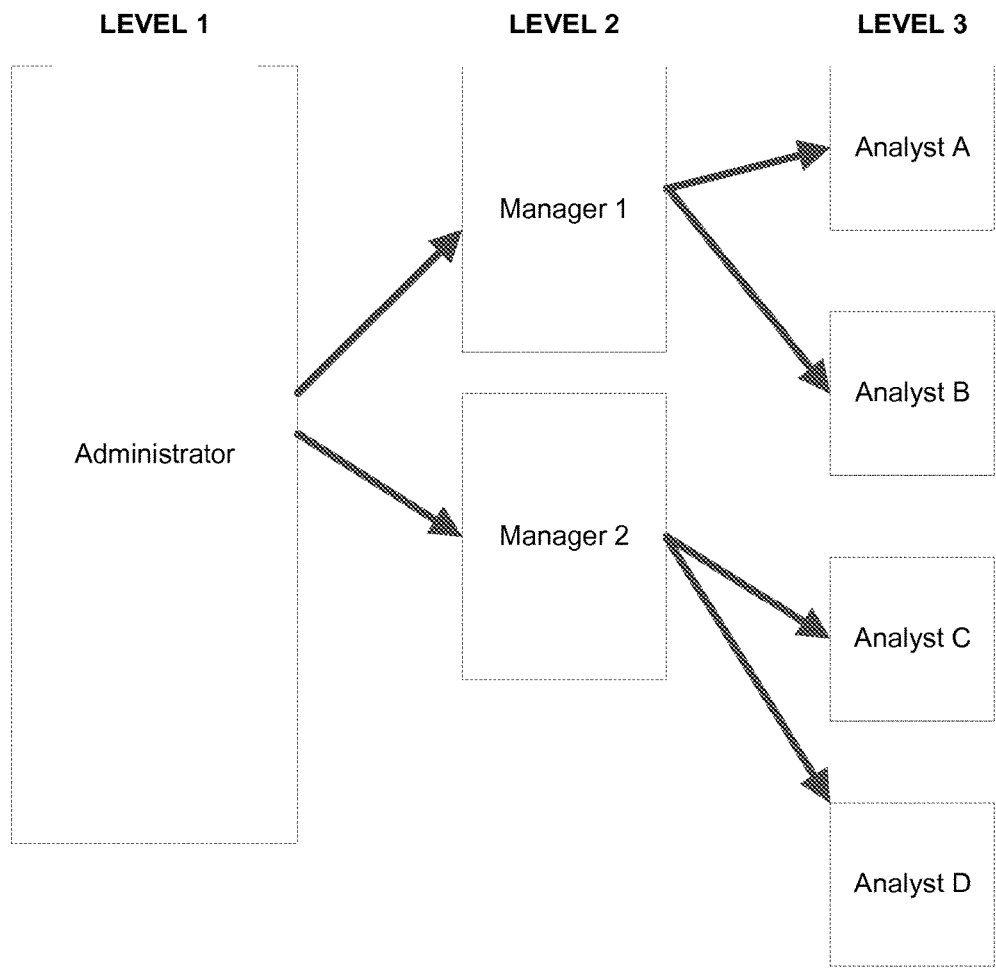
FIG. 9 illustrates a hierarchy of security rights according to an aspect of the present disclosure.

According to an aspect of the present disclosure, the data mining system may provide an ability for managers or high level user to subdivide the analysis into discrete, secure modules. A variety of permissions can be assigned to the analysts to control both the input and processed data. FIG. 9 illustrates a flow diagram for the levels of security.

For example, as shown in FIG. 9, a user designated as an administrator may have access to all of the data obtained via the system. The administrator may be referred to as a level 1 user. The administrator may provide specific permissions to level 2 users, such as a first manager (manager 1) and a second manager (manager 2). The managers may have the same access as the administrator or may have less access than the administrator. Furthermore, the levels of access for each manager may be the same as or different from each other. The managers may then control the level of access by each data analyst (Analysts A-D). The levels of access for each analysis may be the same as or different from each other.

As previously discussed, extractors may be deployed on target data sources. The data extracted by the extractors may be transmitted to a cloud-based infrastructure. The cloud-based infrastructure allows for on-demand scaling of resources and deployment of multiple extractors that may be processed in parallel.

The dynamic parallel computing structure may be used to process data without impeding speed. Specifically, the extractors and data analysis modules are dynamically configurable between sequential and parallel processing to improve efficiency.

Figure 10A:
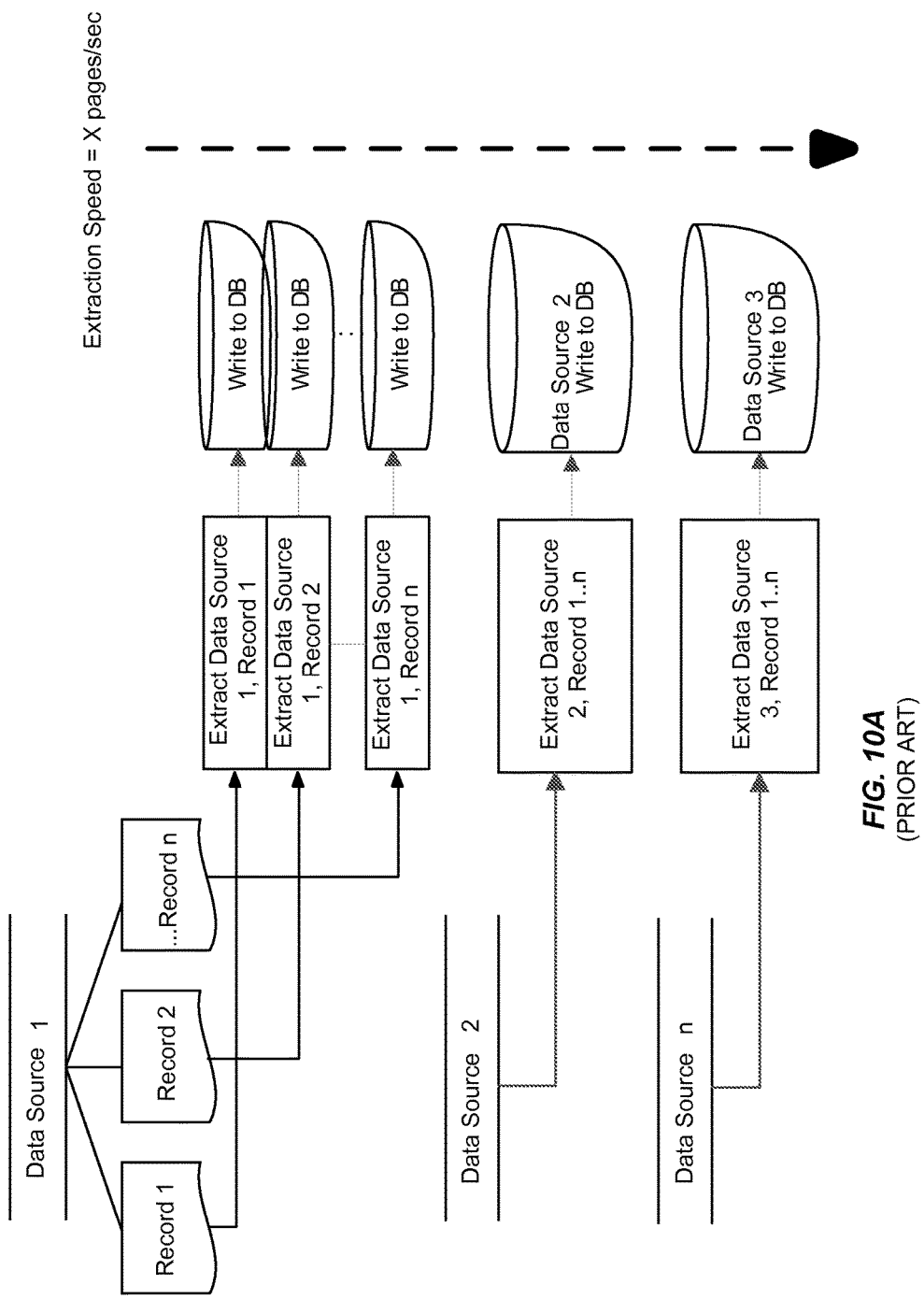
FIGS. 10A and 10B illustrate typical sequential data extraction schemes.

FIG. 10A illustrates a typical sequential data extraction system. As shown in FIG. 10A data sources (e.g., data source 1-data source n) are sequentially analyzed. More specifically, each record (e.g., record 1-record n) of the data source is extracted one record at a time. The records to one record in a data source, such as a web page, database entry, etc. The speed of the extraction is limited by the speed of the processor(s). After extracting the record from a data source, the record is written to a data base.

Figure 10B:
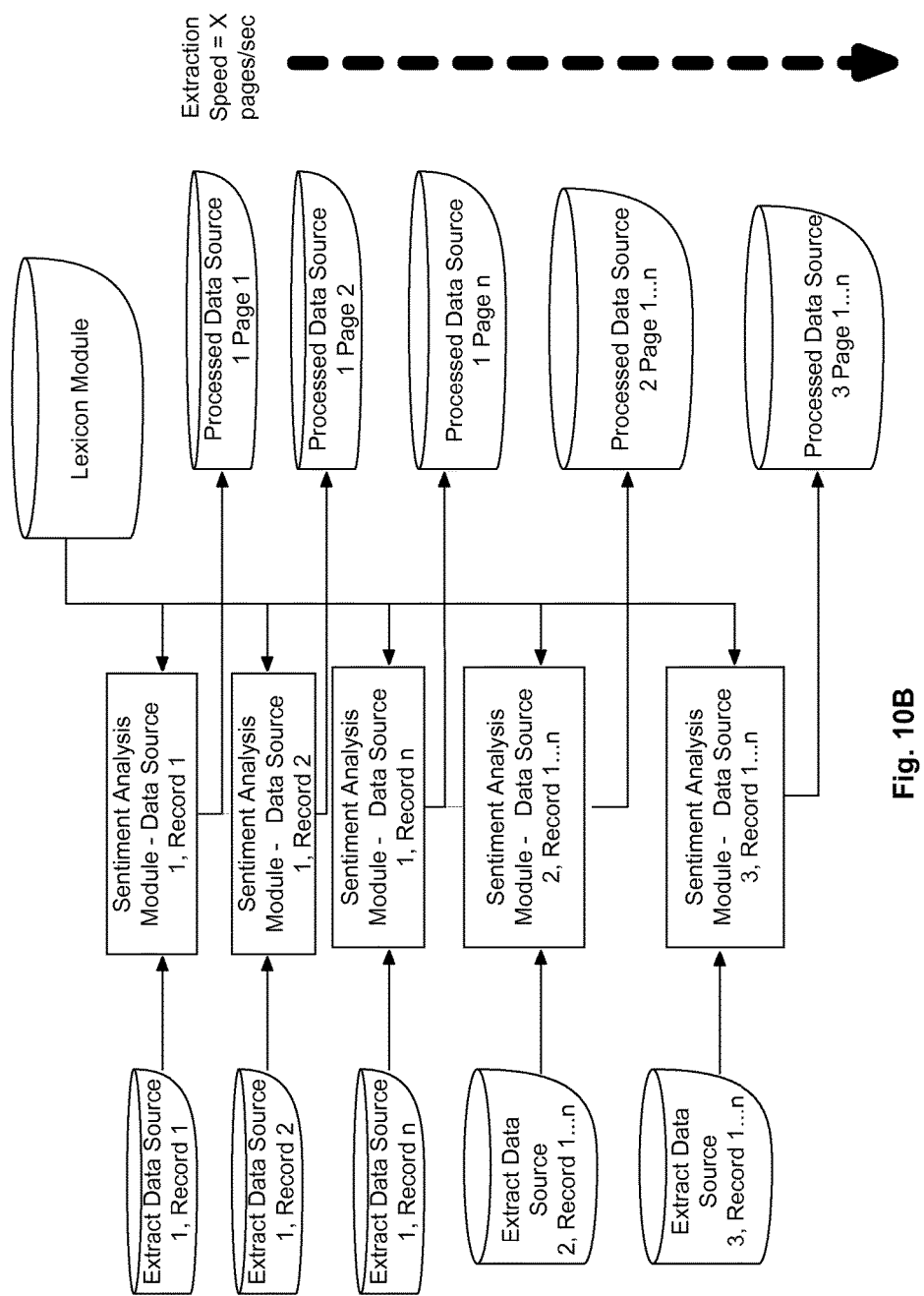

Furthermore, as shown in FIG. 10B, a sentiment analysis module may also be specified to process each extracted page. The sentiment analysis module may also be a data analysis module. As shown in FIG. 10B, each extracted data source (e.g., data source 1-data source n) is sequentially analyzed by the sentiment analysis module. The sentiment analysis module may receive an input from the lexicon module. The records processed by the sentiment analysis module may be output from each sentiment analysis module for further processing.

Although sequential processing is a very straightforward approach to data-mining and analysis, it is limited by processing speed. For example, various sub-processes may be slower than others, leading to bottlenecks in the system. Moreover, page extraction speed (X) may be faster than the sentiment analysis processing speed (Y), thus leading to bottlenecks.

Figure 10C:
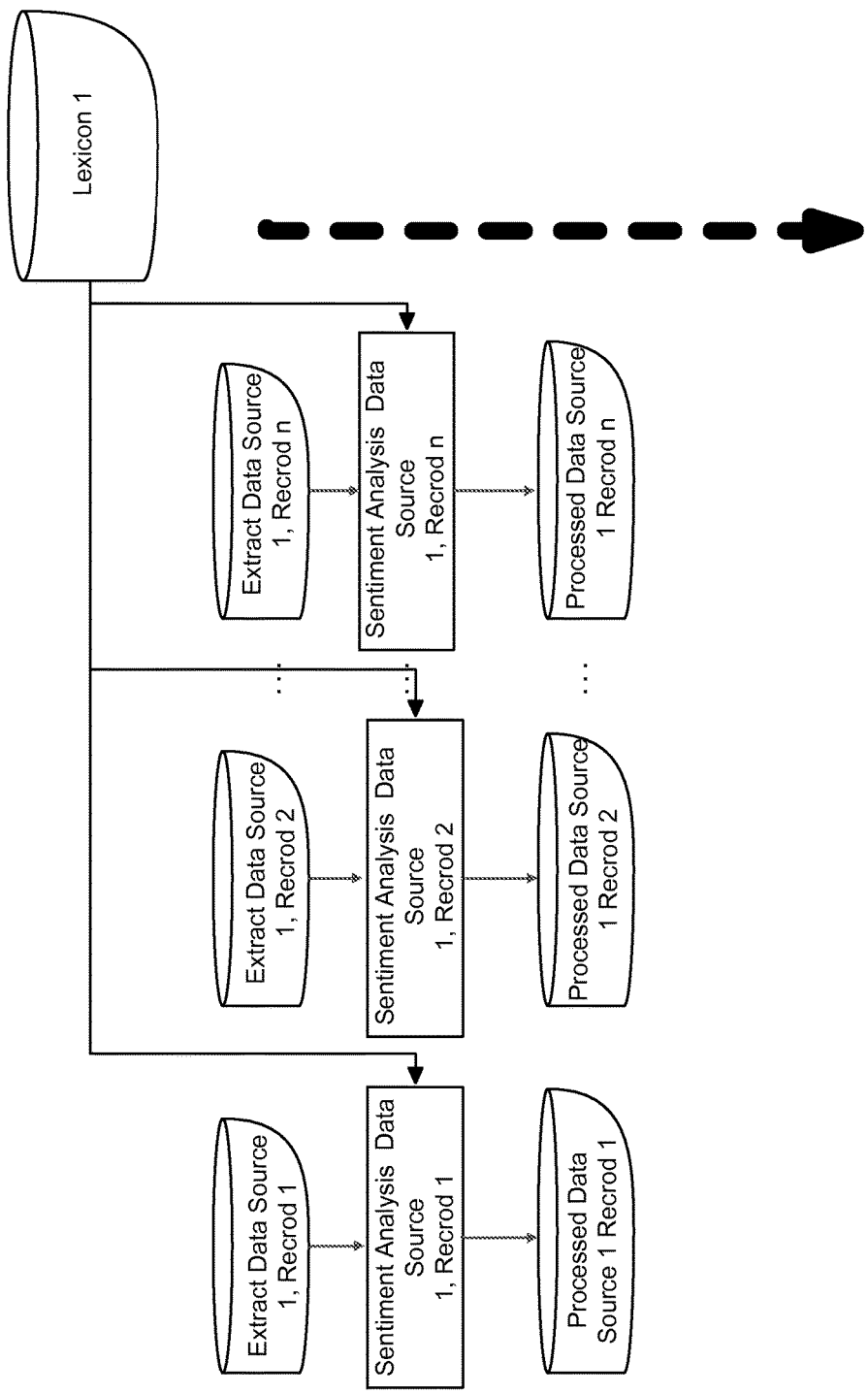
FIG. 10C illustrates a parallel data extraction scheme according to an aspect of the present disclosure.

In one configuration, as shown in FIG. 10C, scalable processing capabilities are specified by deploying multiple instances/sub-sentries to perform sentiment analysis processing in parallel. As shown in FIG. 10C, multiple sentiment analysis modules may be deployed to analyze the records of the extracted data in parallel. In FIG. 10C, the sentiment analysis module may receive an input from the lexicon module. The records processed by the sentiment analysis module may be output from each sentiment analysis module for further processing.

In one example, based on the present configuration, if the extraction speed is four times the sentiment analysis processing speed, 4 sub-sentries may be deployed to perform the sentiment analysis in parallel. Additional sub-sentries may be deployed for buffering needs. In another configuration, if the sentiment analysis processing speed is limited by a large lexicon, sub-sentries may be deployed to process a portion of the lexicon, in parallel. The data mining system of the aspects of the present disclosure monitors the speed of each sub-process, which is input into a controller that dynamically allocates parallel processing instances on-demand.

The data mining system described in the aspects of the present disclosure may obtain large amounts of data with varying levels of sensitivity. That is, some information may include customer sensitive data or data that should only be viewed by individuals have varying degrees of clearance. Thus, it may be desirable to provide a data security system that may be modified based on the procedures of a client of the data mining system.

As previously discussed, the data mining system described in the various aspects of the present disclosure may be used to mine and analyze various forms of data. Provided below are various examples of how the data mining system may be used by governments, individuals, corporations, and/or any desired user. Of course, the use of the data mining system of the present application is not limited to the discussed examples.

In one configuration, the data mining system may be used by a government and/or intelligence agency to monitor global hot spots. For example, governments and/or intelligence agencies may move through vast amounts and types of data, and in multiple languages to find patterns indicating the likelihood of domestic unrest, or the next terrorist attack. However, integrating and manually analyzing multiple data sources in real time is technically challenging, time intensive, and marred by human bias, oversight, and even fraud.

The data mining system described in aspects of the present disclosure finds, monitors, and summarizes the information needed to make the most informed decision in real time. Rather than relying on the manual sifting and analysis of intelligence, data mining system of the present application may use a combination of rules engines and artificial intelligence schemes to detect threat patterns within large datasets before problems reach a tipping point. Through iterations of searches and search results, the data mining system learns to filter data noise and refine queries to prioritize the most relevant results.

The data mining system described in aspects of the present disclosure may determine political sentiment by sampling mass media conversations in any language. Social media outlets, such as Twitter, may be monitored via the data extractors to identify user-defined events, shifts in traffic volume, and/or sentiment. The data mining system may report frequencies on topics, entities, and persons of interest, which may signal the development of a physical event posing a risk to public security.

After identifying a user-defined event, the data mining system notifies the appropriate personnel in real time, communicating the event type, location, and optimal response strategy via a communication channel, such as email or SMS.

In addition to monitoring mass online conversations and their physical impact, in one configuration, the data mining system may also monitor a specific individual. That is, the data mining system may analyze, verify, and cross check a person of interest's information, such as travel, financial, vital, and law enforcement records to identify patterns indicative of fraud, criminal activity, or other threatening behavior. The data mining system may then build a person of interest profile based on verifiable intelligence determined from all available institutional and open-source data feeds, including social media.

As an example, an intelligence agency may monitor sentiment of specific topics and/or groups during. In this example, the intelligence agency would have developed a query for monitoring sentiment of a topic/group. For example, the query may be "show me people upset with the government." In some cases, the query may be further refined to a specific group and/or a specific location.

After the query has been selected, the query may be expanded based on lexical and rule-set based techniques to search structured and unstructured datasets for the keywords of the query. Specifically, the expanded query may generate a topic of interest in addition to sub-topics. The expanded query may then be run on open-source data and closed-source data. After the first pass of the search, the user may expand the topic of interest based on unintended search results.

That is, after the first pass of the search, the use may add additional topics and/or sub-topics in addition to narrowing the search to specific sources. After the search has been narrowed to a desired results threshold, the data extractors are deployed to the selected data sources for monitoring of the data sources.

As an example, the user may have searched for "Arab Spring" as a topic of interest with "unrest" as sub-topics. In this example, a search of the topic of interest and other sub-topics may have generated unintended search results such as results related to social revolutions. Therefore, the user may determine to add "revolution" as sub-topics to a search. Additionally, other false positives may include topics that are not related to the topic of interest. For example, a search for a search of "Arab spring" and other sub-topics may have generated unintended search results such as "Arab spring water" or sources related to the spring season in the Middle East. Accordingly, sources related to these false positives may be excluded from further iterations of the search.

Figure 11:
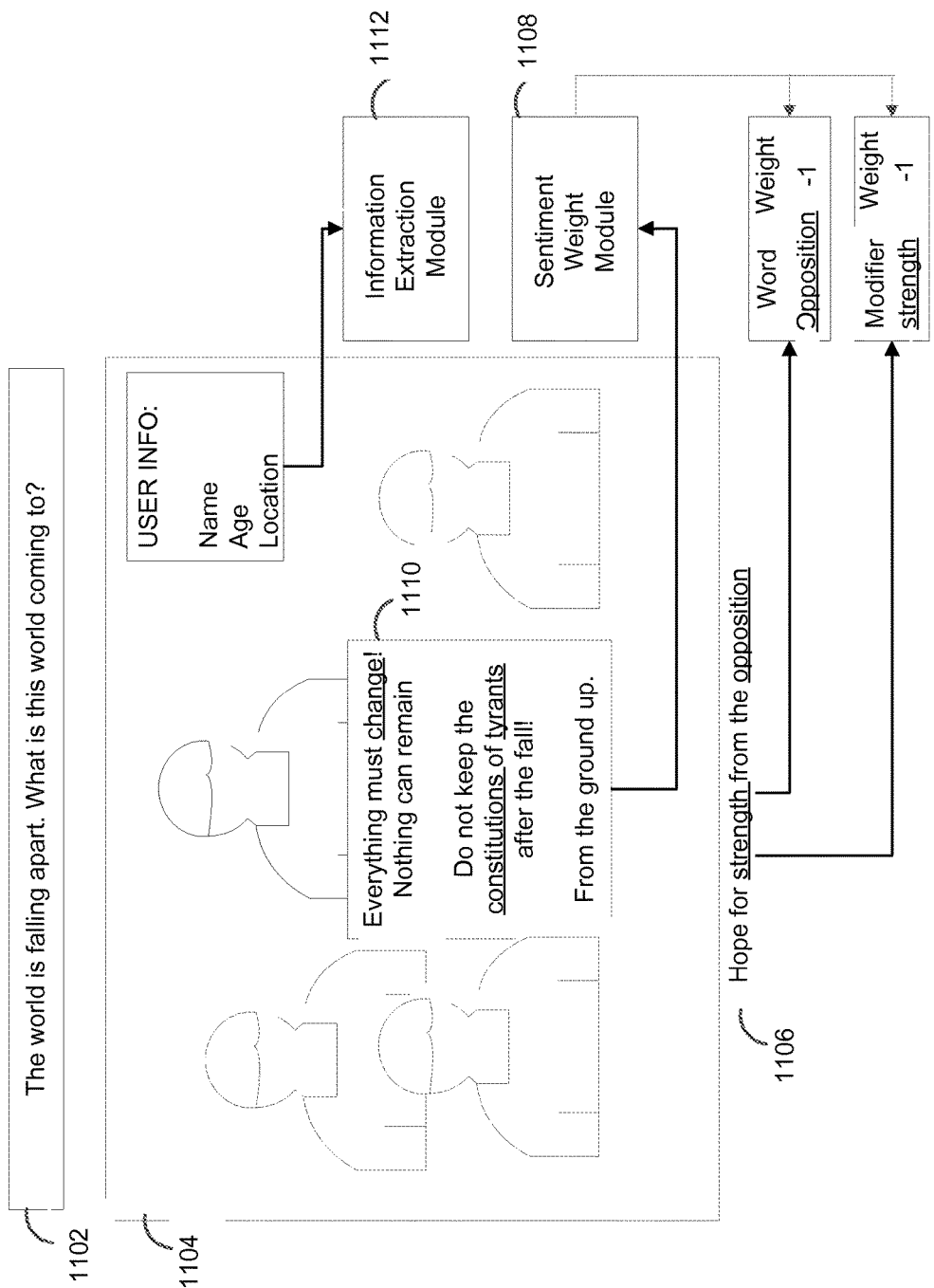
FIGS. 11 and 12 illustrate examples of data extraction and analysis according to an aspect of the present disclosure.

FIG. 11 illustrates an example of data from a data source that is identified by a sentry. The sentry may identify a phrase from a message and/or image posted on a data source, such as a message board and/or a social media site. Specifically, as shown in FIG. 11, the sentry may detect a post 1102 in data source, such as a message board. The post may include an image 1104 and text 1106. In the example data of FIG. 11, the image 1104 is an image of protestors with a billboard. The post 1102 may have been identified based on key words in the text 1106. For example, the key words may have been "strength" and "opposition." Once the post 1102 has been identified, the text 1106 may be analyzed by a data analysis module or a sentiment module. In one configuration, the sentiment is analyzed by the data analysis module 208 and/or a sentiment weight module 1108.

The sentiment analysis assigns weights (e.g., scores) to specific words or phrases that are extracted from a data source. As previously discussed, positives words are assigned a value from 1 to X and negative words are assigned a value from −1 to −Y. Positive words refer to words that indicate a positive sentiment, such as "good," "happy," etc. Negative words refer to words that indicate a negative sentiment, such as "hate," "angry," etc. The more positive or negative the word, the higher the value. For example, the positive word "good" may be assigned a value of 1 while the positive word "fantastic" may be assigned a value of 3. The value assignment may be set by the user or pre-defined based on a specific vernacular.

In the exemplary data shown in FIG. 11, the key words in the text 1106 may be analyzed by the sentiment weight module 1108. The sentiment weight module 1108 may assign a sentiment weight to the words and/or phrases extracted from the text 1106. In this example, the words "opposition" and "strength" are both given a weight of −1. Thus, based on the analysis of the sentiment weight module 1108 a user and/or the data mining system may determine that the detected post 1102 carries a negative sentiment. The total sentiment weight for the extracted data may be the sum of all sentiment weight. In this example, the total sentiment weight is −2 (e.g., sum of "opposition" sentiment weight (−1) and "strength" sentiment weight (−1).

In one configuration, after determining a total sentiment weight for extracted data, the data analysis module, user, and/or data mining system may determine whether to proceed with a second pass for sentiment analysis.

Specifically, in one configuration, for the second pass, the data analysis module performs a more formal computational linguistic analysis to dive deeper into the textual opinions. The second pass may use a natural language processing toolsets on the native script to process and determine sentiment including lemmatization (root-finding), semantic feature analysis, statistical processing to discover patterns, etc. In one aspect of the disclosure, linguistic patterns are specified to populate the topic and modifier tables and create custom lexicons. After the first pass, the system can then reprocess the opinionated text string (OTS) with the improved tables and increase accuracy. The opinionated text string refers to the set of words where the author holds the opinion.

In the exemplary data shown in FIG. 11, during the second pass, the sign 1110 in the image 1104 may be analyzed to determine the sentiment of the text in the sign 1110. In this example, the key words of the sign, such as, "change," "constitutions," and "tyrants," may be given sentiment weights. In one configuration, after determining the total sentiment weight from the second pass, the data analysis module determines to extract the user info for the post for further analysis. In this configuration, the data analysis module determines that the user information should be extracted when the total sentiment weight is above a threshold. The thresholds may be set for positive and/or negative sentiment weights.

The user information may be extracted via an information extraction module 1112. The information extraction module 1112 may be part of the data analysis module, sentiment weight module 1108, and/or a distinct module. The information that is extracted may include the username, actual name, age, location, and/or any other information related to the user that posted the data. In one configuration the extracted information may be used for a new query to follow the user that posted the data.

It should be noted that although FIG. 11 shows the data in English, the aspects of the present disclosure may be applied to data of any language.

In one configuration, after the sentiment of the data is analyzed, quality control is specified for the results of the sentiment. That is, the data and the sentiment weights may be transmitted to a quality control module. A user may review the data transmitted to the quality control module to determine whether the proper sentiment weights were specified for the extracted data. Specifically, the user may determine whether the sentiment analysis missed specific words, gave weights to false positives, and/or applied the wrong weights to specific words. Based on the user analysis, the sentiment analysis may be provided with a quality control value, such as a percentage.

Furthermore, based on the on the user analysis, the lexicon modules and/or sentiment analysis modules may be updated to correct missed words, false positives, incorrect analysis, and/or any other detected errors. After updating the lexicon modules and/or sentiment analysis modules, the sentiment analysis may be subsequently performed. The results of the subsequent sentiment analysis may be further analyzed by a user. The iterations of the sentiment analysis may be performed until the quality control value is equal to or greater than a threshold.

As shown in FIG. 11, in one configuration, the data mining system may be specified to determine political sentiment. Still, in another configuration, the data mining system of the present application may be used for customer service purposes and/or revenue enhancement services. In one configuration, a revenue enhancement service (RES) platform is an end-to-end big solution that generates actionable intelligence and executes individually targeted outreach strategies. The RES platform may use predictive analytics, natural language processing, and automated engagement capabilities, to increase revenue by improving sales, identifying emerging trends, and or streamlining customer interaction.

Consumers may generate large amounts of data that indicate how they spend, what they desire, and where and how they engage. In one configuration, the data mining system may continuously monitors the customer information from data sources, such as social media, web feeds, customer feedback, internal company databases, and proprietary data silos. In this configuration, the data mining system extracts attributes for each customer, such as financial profiles and retail history, to social influences and expressed interests. The RES continues to monitor and analyze the data for product sentiment, consumer patterns, and purchasing behaviors to build customer profiles and generate market intelligence in real-time. Using this intelligence, the customer of the data mining system may determine what are the most likely products and services that each customer is looking for as well as ways to engage with that particular customer.

In one configuration, based on the data retrieved via the data mining system, a company may improve product placement or determine design trends. Moreover, the customer may communicate with the company through their choice of interaction medium (e.g., SMS, email, voice, avatar chat, or a combination thereof) so that the customer may ask questions, resolve issues, and express satisfaction/dissatisfaction. Furthermore, the RES platform may determine customer profiles as well as customer sentiment so customer communications may be accurately routed for the appropriate response. That is, companies may improve outreach to engage with customers knowing who they are, how they feel and what they need.

Figure 12:
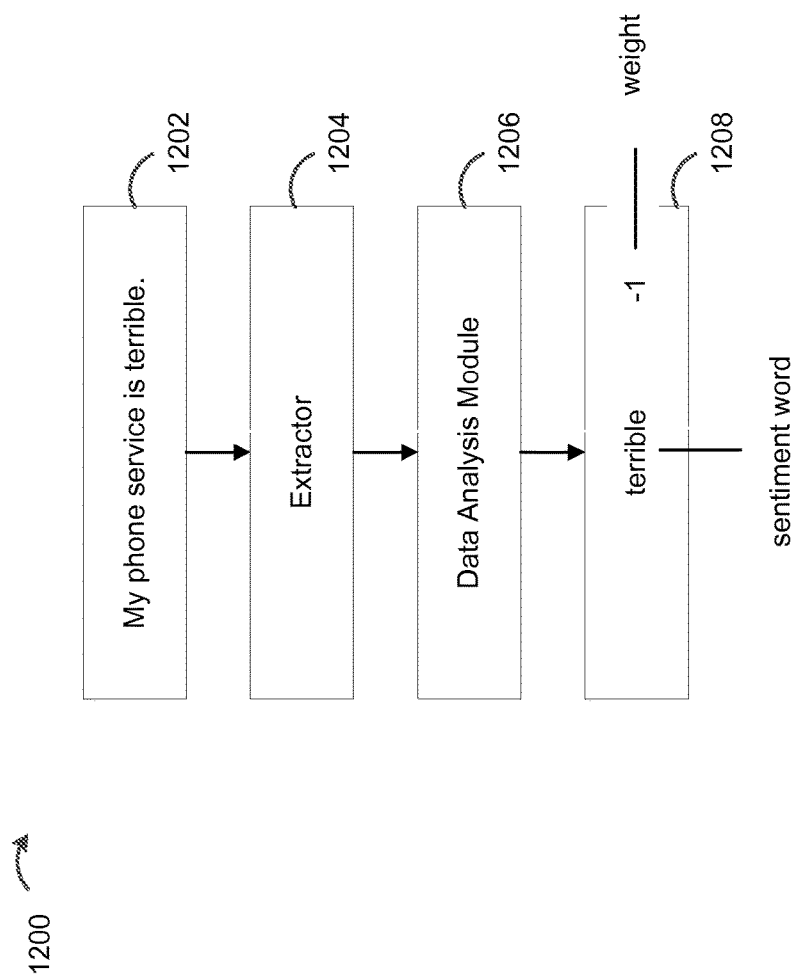

FIG. 12 illustrates an exemplary flow chart 1200 for determining user sentiment based on an aspect of the present disclosure. As shown in FIG. 12, at block 1202 an individual may post data on a data source, such as a public forum or social media. In this example, the data is an indication of a phone user's sentiment for their phone service, specifically, "my phone service is terrible." At block 1204 an extractor that is monitoring the data source determines that the data post of block 1202 matches the query, therefore, the data extractor extracts the data and transmits the data to the data analysis module. At block 1206 a data analysis module analyzes the data to determine the sentiment of the post. At block 1208 the data analysis module outputs the sentiment word, such as "terrible," and the sentiment weight, such as "−1". Based on the analysis of the data analysis module, a customer communication module may determine an appropriate response. The response may be determined based on the determined sentiment.

In yet another configuration, the data mining system may be used to determine fraud, waste, and/or abuse of a system. In one configuration, the data mining system uses pattern detection based on historical data and correlating factors in datasets to determine potential fraud, waste, and/or abuse of a system. For example, the data mining system may be used in a health care or insurance system to analyze for fraud and/or abuse.

In one configuration, the data mining system is specified to analyze reported claims. The contents of the claim, such as user information, claim type, injury type, etc. are queried at data sources. The data sources may include a health provider data base, subscriber data base, and/or affiliate data base. The query is specified to determine whether the submitted claim has specific fraud characteristics. If it is determined that a claim has fraud characteristics, the data mining system may take appropriate actions, such as notifying an investigation, denying the claim, and/or flagging the claim for further monitoring. In one configuration, when a claim does not have fraud characteristics, the claim may still be flagged so that the individual that made the claim is monitored for future activity.

In one configuration, the data mining system is specified to query one or more data sources for various types of data, such as financial data, operational data, and/or human resources data. For example, one of the data sources may be an operations center. The query may be specified to extract data for further analysis. Thus, the query may be specified to for updates and/or additions to all data in a data source or specific data in the data source. In one configuration, the data that matches the query is extracted and aggregated to a pre-defined format. That is, the data in the data source(s) may be in various proprietary formats. Therefore, it is desirable to aggregate the extracted data to a pre-defined format. Furthermore, after aggregating the extracted data, the data may be analyzed. The analysis may be performed via a data analysis module, such the data analysis module 604.

The analysis may use machine learning, a user generated system, lexicon based matching, natural language processing, and/or predictive processing to analyze the data. The analysis may detect patterns, find key works and/or indexes, determine a probability for an occurrence of an event, and/or perform other types of analysis. In one configuration, the analyzed data may be visualized. The visualization may be a sentiment heat map 308, bar graph 302, the pie chart 304, plot graph 306, and/or any other type of visualization.

Finally, in one configuration, based on the analyzed data, the data mining system may take appropriate actions, such as generating an actionable alert. As an, an actionable alert may be generated when a maximum allowed expense for a cost center is exceeds a threshold. For example, a threshold of a maximum expense of $1 million dollars per month is set, and the actual expense data is $1.2 million dollars. In this example, the cost center Manager will be notified that the threshold has been passed. The Manager may then take appropriate actions based on the alert.

According to an aspect of the present disclosure, the data mining system is specified to improve a customer's travel experience. For example, a query may be generated to query one or more data sources for information related to traveling. The information may be travel information prior to traveling, during traveling, and/or after traveling. In one configuration, the query is related to itinerary changes, local deals, expenses accrued in relation to traveling, corporate travel policy, and/or other travel related information. The corporate travel policy may be information for budget caps, preferred hotels, preferred airlines, and/or other information related to corporate travel.

The data source(s) may include a traveler's calendar, a database of deals, a traveler's rewards account, enterprise data, credit card information, the traveler's location, and/or any other data source that includes travel information. The rewards account may be an account such as a frequent flyer account. In this configuration, the data mining system generates an actionable alert when new data and/or a change in data match the query.

As an example, once a traveler has booked a trip (e.g., hotel and/or flight) to a destination, a query is generated to monitor the one or more data sources. In this example, if there is a change to an itinerary, an actionable alert may be generated for the traveler. The change in itinerary may be detected based on a change to the traveler's calendar, a change in a rewards account, a change in a credit card transaction, and/or a change any other data source that includes travel information.

As another example, prior to embarking on the planned travel, the query may determine local deals based on the traveler's destination. The local deals may be determined from one or more data sources that include local deals. Furthermore, an actionable alert may be generated for the traveler if a local deal is found. As another example, the local deals may be determined while the traveler is at a specific destination. In this example, the local deals may be determined using a data source that includes the traveler's location as well as a data source that includes local deals.

In yet another example, after travel has been booked, a traveler may be notified that their booked hotel, airline, rental car, and/or other travel related item is no longer qualified by a corporate travel policy. The notification may also indicate that travel expenses accrued prior and/or during travel have exceeded the corporate travel limit. Furthermore, in one example, the query may search expenses from a credit card data source and/or other financial data source to determine travel related expenses. The data mining system may then generate and submit an expense report based on the matched query.

In one configuration, the data mining system is configured to query one or more data sources for information regarding bullying. For example, the query may search for specific words, phrases, images, and/or videos related to bullying in a bullying report database and/or social media. The bullying reports may be submitted by victims and/or witnesses. The reports may include a description, audio, and/or video of an incident.

In this configuration, an actionable alert is generated when a query identifies a new and/or updated bullying incident. The actionable alert may be transmitted to authorities, such as school officials, parents, and/or police.

In one configuration, the data mining system is configured to query one or more data sources for a user defined topic of interest. The data source(s) may include surveys, feedback forms, user comments, and/or any type of data. For example, the data source may be a survey data source and/or social media. The query may be specified to search for updates and/or additions to all data in a data source or specific data in the data source. After extracting the data, the data may be analyzed. The analysis may be performed via a data analysis module, such the data analysis module 604.

In one configuration, the analysis is specified to determine public sentiment. Of course, aspects of the present disclosure are not limited to determining public sentiment and the analysis may be performed to determine any metric. The analysis may use machine learning, a user generated system, lexicon based matching, natural language processing, and/or predictive processing to analyze the data. The analysis may detect patterns, find key works and/or indexes, determine a probability for an occurrence of an event, and/or perform other types of analysis. The results of the analysis may be communicated to a user for further processing.

In one configuration, the data mining system is configured to query one or more data sources for financial transactions. The data source(s) may include a bank account and/or a credit card account. The query may be specified to identify updates and/or additions to the financial information. The financial information may be in different formats. For example, one format may be transactional data, such as a posted transaction. Another format may be non-transactional data or user provided data, such as an image of a receipt or check. A match to the query may result in an actionable alert to a customer. Additionally, a match to the query may result in an expense report being generated for the financial transaction.

As an example, the user may set a query to determine when financial transactions at a coffee shop exceed a pre-defined budget. The query may then monitor one or more of the user's financial data sources. When a transaction at a coffee shop is posted, the query receives a match and increments a variable with the amount of transaction. Accordingly, if the variable is greater than the pre-defined budget, an alert may be sent to the user.

As an example, the user may set a query to determine when a new image is added to a financial data source. The query may then monitor one or more of the user's financial data sources for a new image. When an image, such as an image of a check or an image of a receipt is posted, the query receives a match. In this example, data from the image is extracted and the amount may be incremented to a ledger and/or an expense report may be generated based on the extracted information.

In one configuration, the data mining system is configured to monitor one or more data sources for a user's financial transactions. Spending patterns may be determined from the financial transactions via a data analysis module, such the data analysis module 604. Additionally, the data mining system is configured to monitor one or more data sources for deals, such as coupons, deals, rewards, and/or other incentives for existing and/or potential customers.

In one example, the data mining system may determine a deal based on an identified spending pattern. For example, based on a query for spending patterns, the data mining system identifies that a user has increased spending at a specific coffee merchant. Based on the identified coffee spending pattern, the data mining system may query the deal data source(s) to identify deals related to the coffee spending pattern. The query may identify existing deals and/or the query may continuously monitor the data source to determine when a deal is identified. Furthermore, once a deal is identified, an actionable alert may be generated for the user.

In another example, the query may identify a new deal from a merchant. Furthermore, after determining the new deal, the query may then monitor the spending patterns of users to identify potential targets for the deal. Once a target (e.g., user) for the deal is identified, an actionable alert may be generated for the user.

In yet another example, the query may identify a user's spending patterns. Furthermore, based on the spending patterns, a user may earn points to be used for deals, trips, and/or merchandise. The points and/or spending patterns may be updated when new financial transactions are identified by the query.

In one configuration, the data mining system is configured to query one or more data sources for user information as well as other financial information. The financial information may include public information and/or user received information, such as mortgage rates, interest rates, housing prices, location data, a user's financial data (e.g., credit score, account balances, income, etc.). The user's financial data may be information received via application forms, such as a loan or credit application, and/or tax forms. The user information may also include the user's location (e.g., current location, business location, and/or residence). In response to identifying data via the query, an actionable alert may be generated to a user. The alert may suggest a vendor/service and/or a path to a goal. Vendors/services may include loan vendors, credit vendors, and/or other vendors of financial related services.

For example, the alert may suggest a low interest credit card based on the user's credit score and account balances. As another example, the alert may suggest a service to repair a credit score based on the user's credit score. In yet another example, a path to a goal may include suggestions for how to save money in view of current spending patterns to reach a user-defined goal or a system suggested goal.

In one configuration, the data mining system is configured to query one or more data sources for user information as well as other health related information. The health related information may include locations for health care providers, a user's insurance information, and/or a user's health records. The user information may include the user's location (e.g., current location, business location, and/or residence). In response to identifying data via the query, an actionable alert may be generated to a user.

The alert may suggest a nearby health care provider that is approved by insurance. The alert may also suggest updated insurance information. Furthermore, the alert may include an application for enrollment in health plans. In one configuration, the information in the application is pre-populated with user information obtain from one or more of the data sources.

In one configuration, the data mining system is configured to query one or more data sources for customer service issues and/or a user defined topic of interest. The data source may be one or more data sources that include knowledge centers, FAQs, user comments, or any type of data. The query may be specified to search for updates and/or additions to all data in a data source or specific data in the data source. After extracting the data, the data may be analyzed for sentiment, trends, or other analysis. The analysis may be performed via a data analysis module, such the data analysis module 604.

In one configuration, the data mining system is configured to query one or more data sources for data that is to be processed for summarization (e.g., abstraction). For example, the data may include documents and/or images. The data may be unstructured (e.g., not in machine readable format). In this configuration, when the data has been identified, the data is converted to a machine readable format and summarized. For example, optical character recognition may be applied to convert the data into structured data. Furthermore, the summarized data may be available for further analysis. The summarized data may be referred to as abstracted data.

As an example, the one or more data sources may include lease information. In this example, when an update to an existing lease or a new lease is provided, the query extracts the lease and the information is converted to a machine readable format. Furthermore, after the conversion, the lease may be summarized. Additionally, the summary may then be available for further queries or analysis.

In another example, the one or more data sources may include legal documents, such as a court decisions. In this example, when a new court decision has been entered, the query extracts the court decision and the information is converted to a machine readable format. Furthermore, after the conversion, the court decision may be summarized. Additionally, the summary may then be available for further queries or analysis.

In one configuration, the data mining system is configured to query one or more data sources that include a user's location, device information, as well as a user's contact preferences. The information may include a user/device GPS location, wireless device information, a radio access technology (RAT) the device is connected to (e.g., connected to WiFi or LTE), a cell tower the device is connected to, a SIM card used by the device, and/or other communication related information. In this configuration, the information obtained from the data sources may be used for virtual contact card as well as contact rules based on a user's preference. That is, when an update or new information is provided for a first user's location, device information, and/or the first user's contact preferences, an alert may be generated to one or more second users. The alert may inform the second user regarding the first user's contact preferences. The alert may be transmitted to the second user's device, such that the second user is not identified that the first user's contact information has been updated. The alert may also be sent to one or more of the first user's devices to update outgoing communication rules.

In one example, a query may be generated to monitor what type of RAT a first user's device is connected to. Furthermore, a data source may receive an update indicating that the first user's device is only connected to WiFi. Based on the update, an alert is sent to one or more second users. The alert may indicate that until further notice, the first user should only be contacted via voice over IP (VoIP) or other Internet based communications. Additionally or alternatively, in this example, when the query determines that the first user is only connected to WiFi, an alert may be generated for the first user's device so that the first user's device may only perform outgoing communications via VoIP or other Internet based communications.

In another example, a query may be generated to monitor a user's calendar. In this example, when a new calendar entry or updated calendar entry is determined from the query, the user's contact preference may be alerted to the user or other users. For example, a first user may update their calendar to include a business meeting during a specific data. Based on the updated calendar, an alert is transmitted to one or more second users to update the first user's contact preference. For example, the first user may only desire to receive SMS messages during the meeting. Thus, if a second user attempts to contact the first user during the scheduled meeting, the second user may only be able to contact the first user using SMS based on the updated contact preference.

In one configuration, the data mining system is configured to query data sources for health related information, secure messaging, and/or scheduling information. For example, the information may include a physician's schedule, such that an alert is generated when a new or updated schedule is provided to the data source. As another, in a healthcare environment, the queried data queried may include contact information, health records, and/or a physician's schedule. An alert may be generated, when a new schedule or an update to a physician's schedule is received in the database. Alerts may also be generated upon the entry of a new communication in the database.

As previously discussed, according to aspects of the present disclosure the search terms of the query may be expanded. In the above mentioned examples, the search terms may be expanded if desired. Additionally, according to aspects of the present disclosure, in some cases, one or more data sources from the multiple data sources are selected when results of the query are greater than or equal to an accuracy thresholds. In the above mentioned examples, the selection of one or more data sources based on the accuracy threshold may be performed as desired. Still, the above mentioned examples are not limited to expanding the query and/or selecting one or more data based on the accuracy threshold.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of analyzing data, comprising:
   generating, by an entity, a query based at least in part on a topic of interest;
   executing the query on a plurality of data sources, at least one of the plurality of data sources comprising financial transaction information;
   selecting, by the entity, a data source from the plurality of data sources for monitoring based on a correlation between the data source and the topic of interest, the correlation determined based on results of the executed query;
   monitoring, based on a set schedule, the data source for matches to the query to extract data from the data source when at least an update to stored data matches the query, newly added data matches the query, or a combination thereof;
   extracting data from the data source when at least an update to stored data matches the query, newly added data matches the query, or a combination thereof;
   determining an extraction rate for extracting the data, the extraction rate indicating an amount of the data that is extracted over a first time period;
   determining a first processing rate for processing the extracted data with a number of parallel processors, the first processing rate indicating an amount of extracted data that is processed over a second time period;
   dynamically adjusting the number of parallel processors for analyzing the extracted data based on the extraction rate to obtain a second processing rate that is greater than the first processing rate;
   analyzing, with the parallel processors, the extracted data to determine at least one of a sentiment, an index, a pattern, or a combination thereof;
   establishing a two-way communication channel, between at least the entity that selected the data source for monitoring and a user device of a user that provided data to the data source, based on the analysis of the extracted data;
   transmitting, from the entity via the two-way communication channel, a first message directed to the user device based on the analysis of the extracted data; and
   receiving, from the user device via the two-way communication channel, a second message in response to the first message directed to the user device.

2. The method of claim 1, further comprising visualizing the extracted data.

3. The method of claim 1, further comprising:
   refining search terms for the topic of interest based at least in part on the executed query, and in which the monitoring is performed to monitor for matches to a refined query.

4. The method of claim 1, in which the plurality of data sources include open-source data sources that are publically available and closed-source data sources that are not publically accessible.

5. The method of claim 1, in which the query is a natural language query, and
   further comprising translating the query to a system understood language.

6. The method of claim 1, further comprising expanding search terms of the query to include at least one of relevant terms, misspellings, or a combination thereof; and
   in which the data source is selected when the correlation is greater than or equal to an accuracy threshold.

7. The method of claim 6, in which expanding the query comprises expanding the search terms to include at least misspellings, synonyms, sub-topics, antonyms, or a combination thereof.

8. The method of claim 1, in which at least one of the plurality of data sources is a bank account or a credit card account.

9. The method of claim 1, in which the two-way communication channel transmits an alert when spending exceeds a threshold.

10. The method of claim 1, in which the two-way communication channel is used to submit an expense report that is generated based at least in part on the data extracted from the data source.

11. The method of claim 1, in which the two-way communication channel comprises at least one of short message service (SMS), click-to-voice, interactive voice response (IVR), e-mail, phone, Internet protocol, message board, social media, digital communication, or a combination thereof.

12. The method of claim 1, further comprising analyzing, by an entity user corresponding to the entity, the results of the query in view of the topic of interest and a sub-topic of interest; and
   determining, by the entity user, the correlation between the data source and the topic of interest based on the analysis of the results of the query.

13. An apparatus for analyzing data, the apparatus comprising:
   a memory; and
   at least one processor coupled to the memory, the at least one processor being configured:

to generate, by an entity, a query based at least in part on a topic of interest;

to execute the query on a plurality of data sources, at least one of the plurality of data sources comprising financial transaction information;

to select, by the entity, a data source from the plurality of data sources for monitoring based on a correlation between the data source and the topic of interest, the correlation determined based on results of the executed query;

to monitor, based on a set schedule, the data source for matches to the query to extract data from the data source when at least an update to stored data matches the query, newly added data matches the query, or a combination thereof;

to extract data from the data source when at least an update to stored data matches the query, newly added data matches the query, or a combination thereof;

to determine an extraction rate for extracting the data, the extraction rate indicating an amount of the data that is extracted over a first time period;

to determine a first processing rate for processing the extracted data with a number of parallel processors, the first processing rate indicating an amount of extracted data that is processed over a second time period;

to dynamically adjust the number of parallel processors for analyzing the extracted data based on the extraction rate to obtain a second processing rate that is greater than the first processing rate;

to analyze, with the parallel processors, the extracted data to determine at least one of a sentiment, an index, a pattern, or a combination thereof;

to establish a two-way communication channel, between at least the entity that selected the data source for monitoring and a user device of a user that provided data to the data source, based on the analysis of the extracted data;

to transmit, from the entity via the two-way communication channel, a first message directed to the user device based on the analysis of the extracted data; and to receive, from the user device via the two-way communication channel, a second message in response to the first message directed to the user device.

14. The apparatus of claim 13, in which at least one of the plurality of data sources is a bank account or a credit card account.

15. The apparatus of claim 13, in which the two-way communication channel is used to submit at least one of an expense report that is generated based at least in part on the data extracted from the data source, an alert when spending exceeds a threshold, or a combination thereof.

16. The apparatus of claim 13, in which the two-way communication channel comprises at least one of short message service (SMS), click-to-voice, interactive voice response (IVR), e-mail, phone, Internet protocol, message board, social media, digital communication, or a combination thereof.

17. A non-transitory computer-readable medium having program code recorded thereon for analyzing data, the program code being executed by a processor and comprising:

program code to generate, by an entity, a query based at least in part on a topic of interest;

program code to execute the query on a plurality of data sources, at least one of the plurality of data sources comprising financial transaction information;

program code to select, by the entity, a data source from the plurality of data sources for monitoring based on a correlation between the data source and the topic of interest, the correlation determined based on results of the executed query;

program code to monitor, based on a set schedule, the data source for matches to the query to extract data from the data source when at least an update to stored data matches the query, newly added data matches the query, or a combination thereof;

program code to extract data from the data source when at least an update to stored data matches the query, newly added data matches the query, or a combination thereof;

program code to determine an extraction rate for extracting the data, the extraction rate indicating an amount of the data that is extracted over a first time period;

program code to determine a first processing rate for processing the extracted data with a number of parallel processors, the first processing rate indicating an amount of extracted data that is processed over a second time period;

program code to dynamically adjust the number of parallel processors for analyzing the extracted data based on the extraction rate to obtain a second processing rate that is greater than the first processing rate;

program code to analyze, with the parallel processors, the extracted data to determine at least one of a sentiment, an index, a pattern, or a combination thereof;

program code to establish a two-way communication channel, between at least the entity that selected the data source for monitoring and a user device of a user that provided data to the data source, based on the analysis of the extracted data;

program code to transmit, from the entity via the two-way communication channel, a first message directed to the user device based on the analysis of the extracted data; and program code to receive, from the user device via the two-way communication channel, a second message in response to the first message directed to the user device.

18. The non-transitory computer-readable medium of claim 17, in which at least one of the plurality of data sources is a bank account or a credit card account.

19. The non-transitory computer-readable medium of claim 17, in which the two-way communication channel is used to submit at least one of an expense report that is generated based at least in part on the data extracted from the data source, an alert when spending exceeds a threshold, or a combination thereof.

20. The non-transitory computer-readable medium of claim 17, in which the two-way communication channel comprises at least one of short message service (SMS), click-to-voice, interactive voice response (IVR), e-mail, phone, Internet protocol, message board, social media, digital communication, or a combination thereof.

* * * * *